(12) United States Patent
Birch

(10) Patent No.: US 8,624,982 B2
(45) Date of Patent: Jan. 7, 2014

(54) RECEIVER AND A TRANSMITTER

(75) Inventor: Nicholas Birch, Bristol (GB)

(73) Assignee: Strategy & Technology Limited, London (GB)

( * ) Notice: Subject to any disclaimer, the term of this patent is extended or adjusted under 35 U.S.C. 154(b) by 0 days.

(21) Appl. No.: 13/259,703

(22) PCT Filed: Mar. 24, 2010

(86) PCT No.: PCT/GB2010/000548
§ 371 (c)(1),
(2), (4) Date: Jan. 13, 2012

(87) PCT Pub. No.: WO2010/109188
PCT Pub. Date: Sep. 30, 2010

(65) Prior Publication Data
US 2012/0113269 A1 May 10, 2012

(30) Foreign Application Priority Data

Mar. 24, 2009 (GB) .................................. 0905078.2

(51) Int. Cl.
*H04N 17/00* (2006.01)
(52) U.S. Cl.
USPC .......................................... 348/192; 348/189
(58) Field of Classification Search
USPC ......... 348/468, 705, 706, 726, 727, 180, 189, 348/192
IPC .............. H04N 17/00,17/02, 7/00, 5/268, 5/455
See application file for complete search history.

(56) References Cited

U.S. PATENT DOCUMENTS

| 5,654,751 A | 8/1997 | Richard, III |
| 6,411,623 B1 | 6/2002 | DeGollado et al. |
| 8,310,548 B2 * | 11/2012 | Villanueva et al. ........... 348/180 |
| 2002/0047902 A1 | 4/2002 | Thomas et al. |
| 2004/0160974 A1 | 8/2004 | Read et al. |
| 2006/0290808 A1 * | 12/2006 | Choi et al. .................... 348/468 |
| 2008/0116976 A1 | 5/2008 | Chang et al. |
| 2009/0128708 A1 | 5/2009 | Huffman et al. |

FOREIGN PATENT DOCUMENTS

| EP | 1 427 224 A2 | 6/2004 |
| EP | 1 478 193 A2 | 11/2004 |
| EP | 1 914 940 A1 | 4/2008 |
| GB | 2 441 805 A | 3/2008 |
| JP | 2000 183841 A | 6/2000 |
| WO | WO 00/38359 | 6/2000 |

OTHER PUBLICATIONS

International Search Report for PCT Application No. PCT/GB2010/000548, mailed Dec. 3, 2010.
UKIPO Search Report for GB 0905078.2 dated Jul. 22, 2009.
EPO, Examination Report, dated Aug. 7, 2013, for EPO Application No. 10 714 942.9-1902.
UK Intellectual Property Office, Examination Report, Nov. 4, 2013, for Application No. GB0905078.2.

* cited by examiner

*Primary Examiner* — Sherrie Hsia
(74) *Attorney, Agent, or Firm* — Knobbe, Martens, Olson & Bear LLP

(57) ABSTRACT

A receiver is described for a testing device for a data stream in which the data stream comprises a plurality of encoded data components. The receiver comprises an input for inputting a plurality of encoded data components, a processor for processing the plurality of encoded data components; and a plurality of outputs each for outputting a processed one of the plurality of encoded data components. The receiver is arranged, such that, in use, a plurality of encoded data components received at the input are processed by the processor and a processed one of the plurality of encoded data components is output from one of the plurality of outputs.

11 Claims, 36 Drawing Sheets

| Graphic | Ref | Name | |
|---|---|---|---|
| Watch on xyz1 HD • | 1 | HD available prompt | Shown for a period when watching xyz1 when an HD alternative becomes available as a prompt to the user to navigate to the HD alternative.<br><br>Also shown when user navigates to xyz1 when an HD alternative is available. |
| Loading xyz1 HD | 2 | HD loading screen | Shown once navigation to the HD alternative has been selected by pressing the red key (conceals the transition to the new service). |
| Back to xyz1 SD • | 3 | SD return prompt | Shown for a period after arriving at the HD alternative. Informs the user how to navigate back to the original SD service. |
| xyz1 HD<br>Press • to confirm | 4 | SD return verification | Shown once navigation back to the SD origin has been selected by pressing blue a second time to confirm the user's choice. |
| xyz1 HD has finished | 5 | HD Finished | Shown for a period when viewing the HD alternative when the HD transmission is finishing. |

FIGURE 2

RECEIVER AND A TRANSMITTER

The present invention relates to a receiver and a transmitter and, in particular, a receiver and a transmitter for a testing device for a data stream comprising a plurality of encoded data components.

BACKGROUND OF THE INVENTION

Television (TV) broadcasters have material concerns to ensure that the diverse aspects of digital TV transmissions are correct. For example, they have contractual obligations to the content providers that they carry, contractual obligations to advertisers, and regulatory obligations. Monitoring is required to audit these obligations to prove compliance or failure and to provide feedback to enable timely rectification of defects.

Many areas of TV signals are already addressed by standardised parametric monitoring (e.g. presence of sound within a prescribed range of loudness). However, there are many facets of TV signals that are not amenable to parametric monitoring, particularly interactive television.

Interactive applications rely on data from different systems and can have subtle failure modes. The nature of interactive applications is that their correct operation can only be determined by interacting with and exploring the application. Some interactive applications may have behaviours that cannot be tested by a single receiver. E.g. an application may be required to have different behaviour on high definition (HD) and standard definition (SD) receivers. Some applications may be different in subtle ways between TV services. E.g. there may be regional differences in contact details. Human operators may not be able to reliably validate these differences.

In a multichannel TV environment; due to the above, reliably monitoring interactive applications presents major problems for equipment logistics and man power.

Currently, the approach used to test interactive applications, in particular, is to have people paid to watch TV screens and press the interactive button at appropriate times, to check that functionality is working correctly.

SUMMARY OF THE INVENTION

The invention in its various aspects is defined in the independent claims below, to which reference should now be made. Advantageous features are set forth in the dependent claims.

A preferred embodiment of the invention is described in more detail below and takes the form of a receiver for a testing device for a data stream in which the data stream comprises a plurality of encoded data components. The receiver comprises an input for inputting a plurality of encoded data components, a processor for processing the plurality of encoded data components; and a plurality of outputs each for outputting a processed one of the plurality of encoded data components. The receiver is arranged, such that, in use, a plurality of encoded data components received at the input are processed by the processor and a processed one of the plurality of encoded data components is output from one of the plurality of outputs.

This arrangement provides computational efficiency.

The arrangements described herein relate generally to proving that interactive technology is working correctly. For example, an advertiser may wish to know that a particular advert has been displayed or that the pressing of certain interactive buttons being pressed leads to the correct outcome. Described arrangements check that interactive applications or advertising is working correctly.

Examples of the present invention emulate multiple (potentially multiple per TV service) interactive TV receivers on a high performance computer; provide a test automaton that interacts with each emulated receiver; simulate user interaction with the receiver; and validate and/or record the response of the application.

Examples of the present invention emulate receivers on a high performance computer in this way providing logistical benefits such as 10 fold (or more) improvement in physical volume and power consumption.

Examples of the present invention use a test automaton (rather than using a human operator), which allows greater accuracy and repeatability; more complex test requirements; and greatly reduced staff costs.

Interactive television is used as an example. In this example, instructions are developed for the validation of each interactive application, in some contexts (e.g. interactive advertising) there may be multiple interactive applications deployed over time (e.g. under control of broadcast automation system). Automated monitoring requires a mechanism to deploy appropriate test instructions coordinated with the interactive applications they are to validate.

The problem in monitoring interactive applications or advertising is to check if data is missing. Interaction is actually needed to test what should actually be working. Interaction will also differ for each application and so using existing methods, a large number of people would be needed to perform the tests.

An example proposed solution is to provide virtual set-top boxes running in software, rather than having separate physical set-top boxes, as hardware. For example, a plurality of emulations, for example 100 emulations, could be run on one server. A different emulation is used for each test, such as for HD, SD and then, within that, for each set of tests to be performed. Each virtual set-top box is a test automaton, which is arranged to check various scenarios. There would be no need to fully decode the video, just the graphics or, more generally, the virtual set-top box could just implement as much of the decoder as needed. Further, parts common to all of the virtual set-top boxes could be implemented as one arrangement and just have the functionality needed for separate testing as separate virtual set-top boxes. It would also be possible to have multiple automatons per service to be tested.

As well as examples of automatic implementation of a testing regime, there are examples related to separating the audio visual stream of data from the data to be tested, such as the graphics displayed for interactive TV. Examples also separate core functionality from separate functionality, so as to avoid or at least reduce repetition of functionality for the plurality of virtual set-top boxes.

A further problem is how to describe the testing requirements. A client needs to be able to develop and provide the tests to be implemented. Currently, the client simply describes in a document how the system should work and the test provider has to hard code these in software. A client interface language or graphical user interface could be used, to allow the clients to develop the testing criteria themselves.

A further use of such techniques could be for regression testing. For example, a new version of software should not break features in previous versions and the technique would allow more thorough testing than previous human testing arrangements.

Interactive advertising, applications, and games all need different testing regimes. The testing application needs to have the specifics of the matter to be tested, to allow the test to be performed.

In the examples described, an extra channel of data is transmitted from the broadcast side to the testing regime, specifying the actions and expected responses. For example, the expected key presses and replies can be sent in this additional channel of data against which the stream of AV data and interactive TV data can then be tested. The testing can then be a mix of automatic and these predefined testing steps. A standard format is described for testing data which simplifies the provision of the testing regime. In effect, this is a set of instructions to the testing engine providing a universal interface for testing this type of data. Some tests could be simple, for example, just to check for the existence of data, for example is a weather page present, rather than full testing in which the content of the page is checked. This could be considered as a proof of life, rather than regression testing.

Advantages of the technique include checking for the presence of functionality, such as checking for the presence of advertisements that should be in the data at the right time. The technique could apply equally to hardware and software.

With subtitles, there is typically no interaction with a user. The data is sent separate from the AV (Audio/video) signal. It is not trivial to synchronise subtitles at the AV signal and there are also problems in providing multilingual services from one broadcast station. Checking can be difficult—is the correct language used? Is the correct content present? Various tests are described to check for subtitles being frozen or the wrong language used for services.

In described examples, a facility is presented to a user to give them the ability to check subtitles. A first check is to check the subtitle words against a dictionary in the appropriate language, to check that the correct language is used. If a problem is detected, this would be highlighted to a user. If a problem is detected, then a check could be made against multiple dictionaries to determine which language is being transmitted in error. This is effectively a tool to provide assistance to a human. Further arrangements include an automatic translation (using known techniques) to provide a translations to a human operator, who can then check that the version in their own language matches what they are seeing on screen. This could also be linked to a speech processor to generate a speech version of the text.

Subtitles in DVB (digital video broadcasting) are typically sent as bitmaps and so it can be difficult to test. Character recognition or optical character recognition (OCR) techniques are described as used. The hardware will thus use a combination of dictionary checking, translation, OCR character recognition and speech production in a broadcast receiver.

A solution is described to simplify the co-ordinated deployment of interactive applications and their test instructions. It provides a mechanism for interactive applications to send messages through the emulated receiver to the test automaton. It defines message encoding, which includes features such as: information to allow the application to be identified; operations that the emulated user should perform (e.g. button presses on the remote control); actions that the test automaton should perform (e.g. recording the current receiver display); future messages that the test automaton should expect if the application is successful; interactive applications, in addition to their normal functions, send messages to the test automaton that allow the test automaton to test the interactive application.

This example approach simplifies the information that must be communicated to the monitoring system by the broadcast automation system. For example, the monitor primarily needs to know when to test interactive applications; the details of the test to perform are provided by the interactive application itself.

Descriptive reading matter to be displayed on a television, such as subtitles, require particular test strategies. Subtitle data typically originates from data that is distinct from the video and sound of a TV programme. Common faults include: Subtitle is missing; Subtitle is present but not progressing or is being presented at the wrong time; and Subtitle is not the one intended.

In an international broadcasting environment, a broadcast centre may be responsible for transmitting programmes to multiple countries. Sometimes sending the same pictures and sound but with subtitles appropriate to the language of the country. It may not be practical to have broadcasting staff fluent in all of the languages used to monitor the correctness of the subtitles. Subtitles data can be transmitted either as bit map data (images of text) or as characters.

A variety of example solutions address the various problems presented above. These include emulating multiple (potentially multiple per TV service) TV receivers on a high performance computer, which allows the subtitles on multiple TV services (potentially multiple languages per service) to be monitored efficiently. The emulated receivers can perform testing such as: Is subtitle data present? Is the content changing? (e.g. detect frozen subtitles).

In examples described, correct language of subtitles can be estimated by accumulating text and applying techniques such as spell checking (the frequency of spelling errors is likely to be low when the subtitle language matches the dictionary used). Subtitles in an incorrect language are likely to have a poor match to a dictionary. Comparisons to a variety of dictionaries may allow the actual language to be estimated—this may assist diagnosis of the cause of the error and so accelerate corrective action. Automatic translation (possibly using an Internet resource such as Google (registered trade mark) Translate or Babelfish) can be used to translate subtitles in to a language more comfortable to the broadcast operation staff. The translation does not need to be perfect—it is useful if the translation is good enough to allow an operator to judge if the subtitle is appropriate to the TV programme it supports. Bitmap subtitles can be converted to text using character recognition, such as optical character recognition (OCR).

BRIEF DESCRIPTION OF THE DRAWINGS

The invention will be described in more detail by way of example with reference to the accompanying drawings, in which:

FIG. 2 is a schematic diagram illustrating an example scenario to be tested by examples of the present invention;

DETAILED DESCRIPTION OF THE PREFERRED EMBODIMENT

The preferred embodiment describes a system for monitoring the XYZ HD switching application. The system is upgradeable to perform monitoring of the general range of MHEG interactive applications that a service such as XYZ might deploy. The platform may monitor other data types (e.g. subtitles). It may monitor general MHEG interactive applications and subtitles.

Definitions

ASI: Asynchronous Serial Interface as defined in EN 50083-9
ATE: Automatic Test Equipment
AV: Audio and Video
DVB: Digital video broadcast
"end": The transition of the HDSS from active to inactive
HD: High Definition
HDSS: HD State Signal—a signal from the automation system that signals the operational state of the interactive service. The described system uses three states "On", "Off" and "Boot Out" that relate to the functionality of the interactive service being tested. The transition of the HDSS between these states provides a timing reference for conformance tests. Other interactive services may have greater or fewer states possibly with different semantics.
may: indicates an event or provision which is permitted, but not mandatory.
MHEG-5: Coding of multimedia and hypermedia information as defined in ISO/IEC 13522-5 and other specifications.
must: indicates that a third party must comply to ensure correct operation.
OC: Object Carousel as defined in ISO/IEC 13818-6 and other specifications.
(present tense): indicates an existing provision
SD: Standard Definition
shall: indicates a mandatory provision.
should: indicates a desirable, but not mandatory, provision.
SI: DVB Service Information as defined in ETSI EN 300 468 and other specifications.
"start": The transition of the HDSS from inactive to active.
UI: user interface
will: indicates an assumption about existing states or future events.

Figure 1:
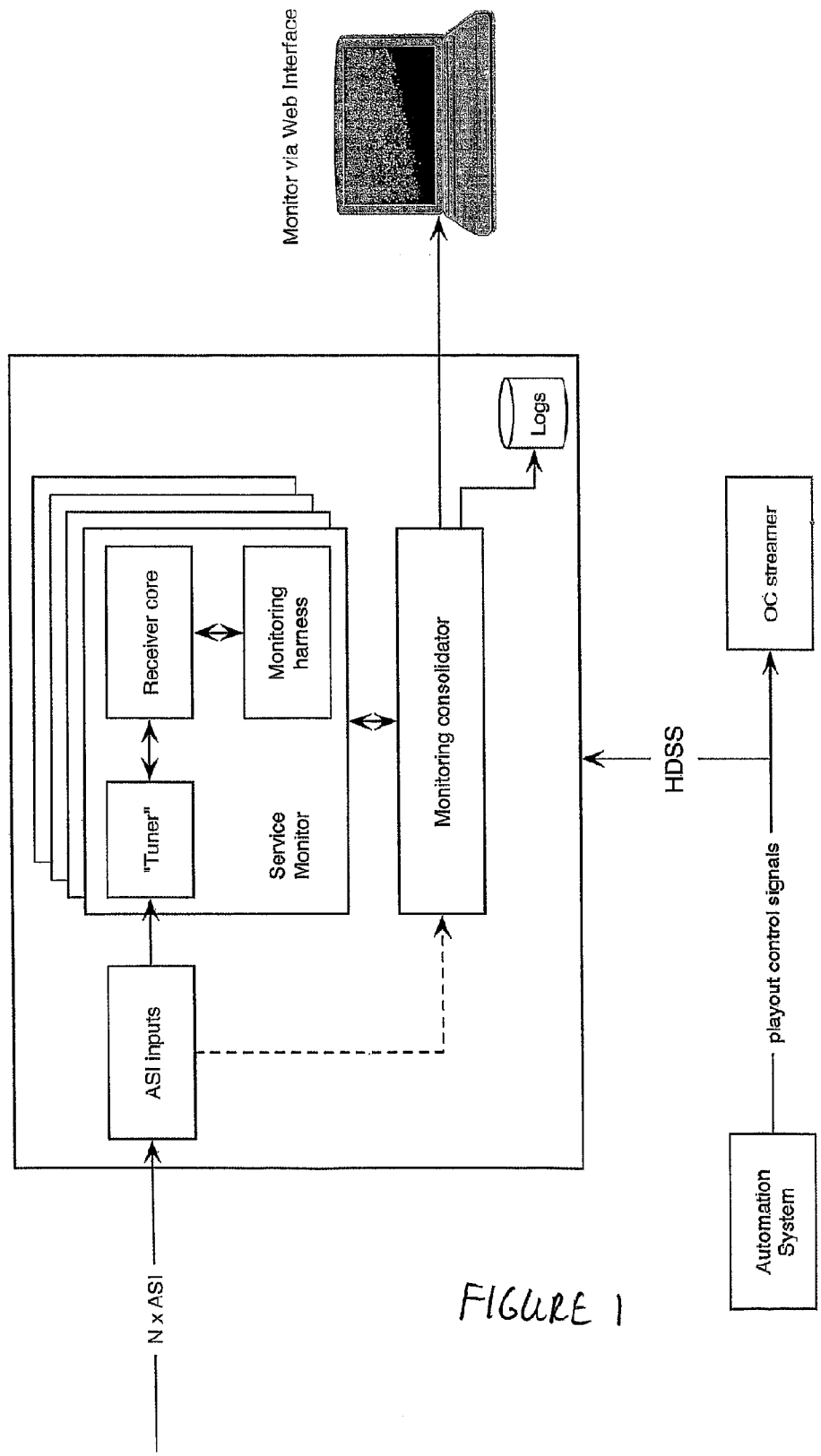
FIG. 1 is a schematic diagram illustrating a system embodying an example of the present invention.
Figure 3A:
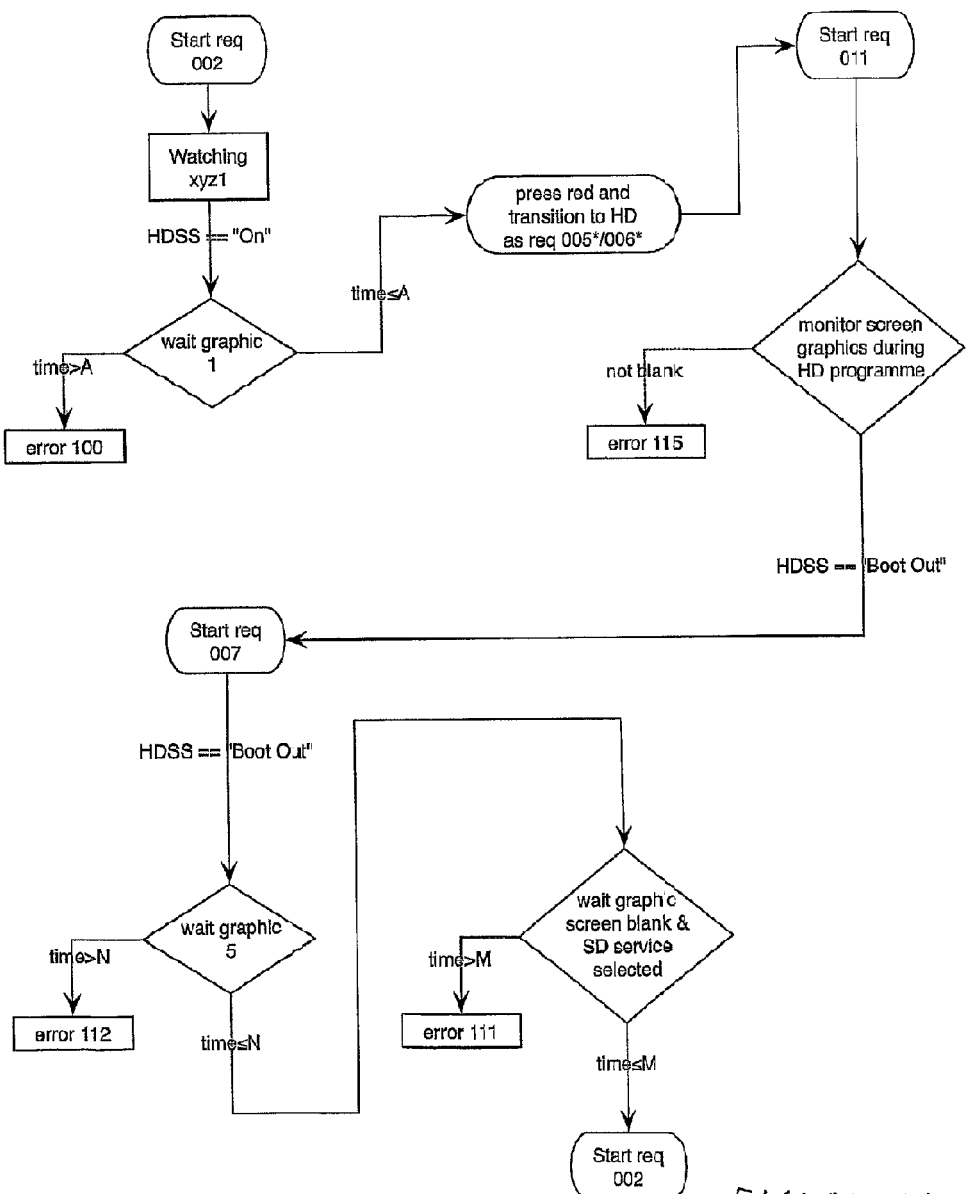
FIGS. 3A to 3I are flow diagrams of receiver responses illustrating an example scenario to be tested by examples of the present invention.
Figure 3B:
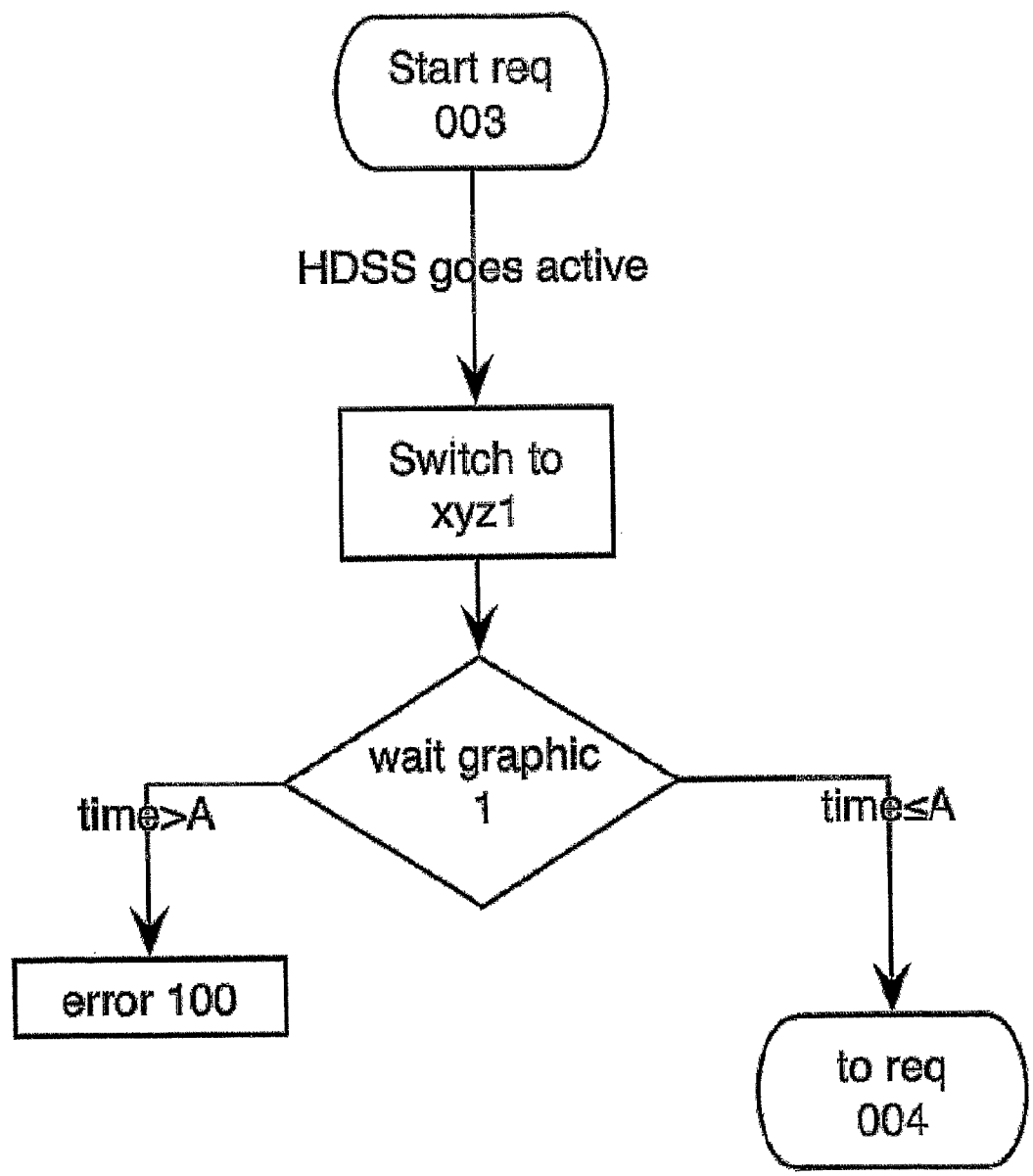
Figure 3C:
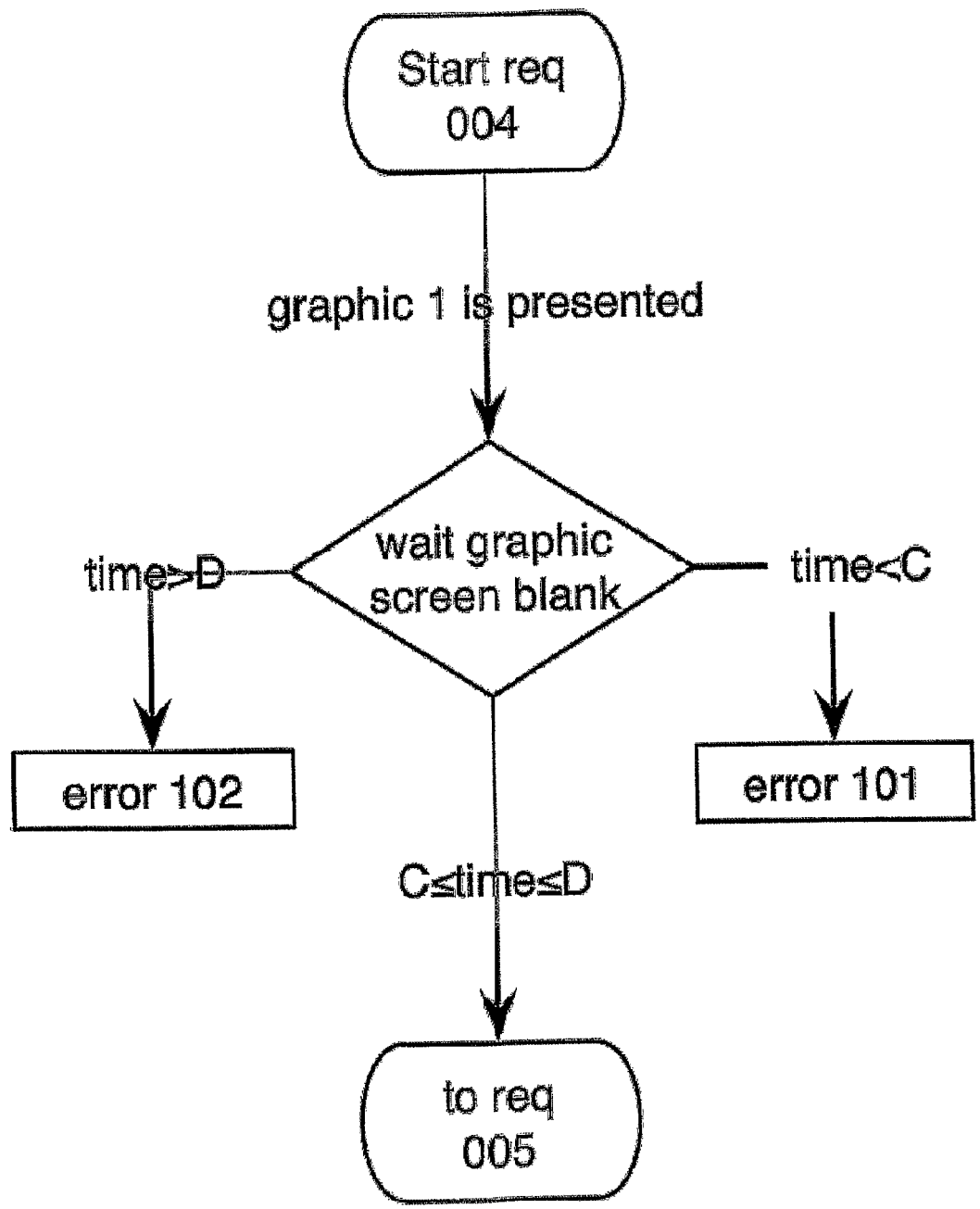
Figure 3D:
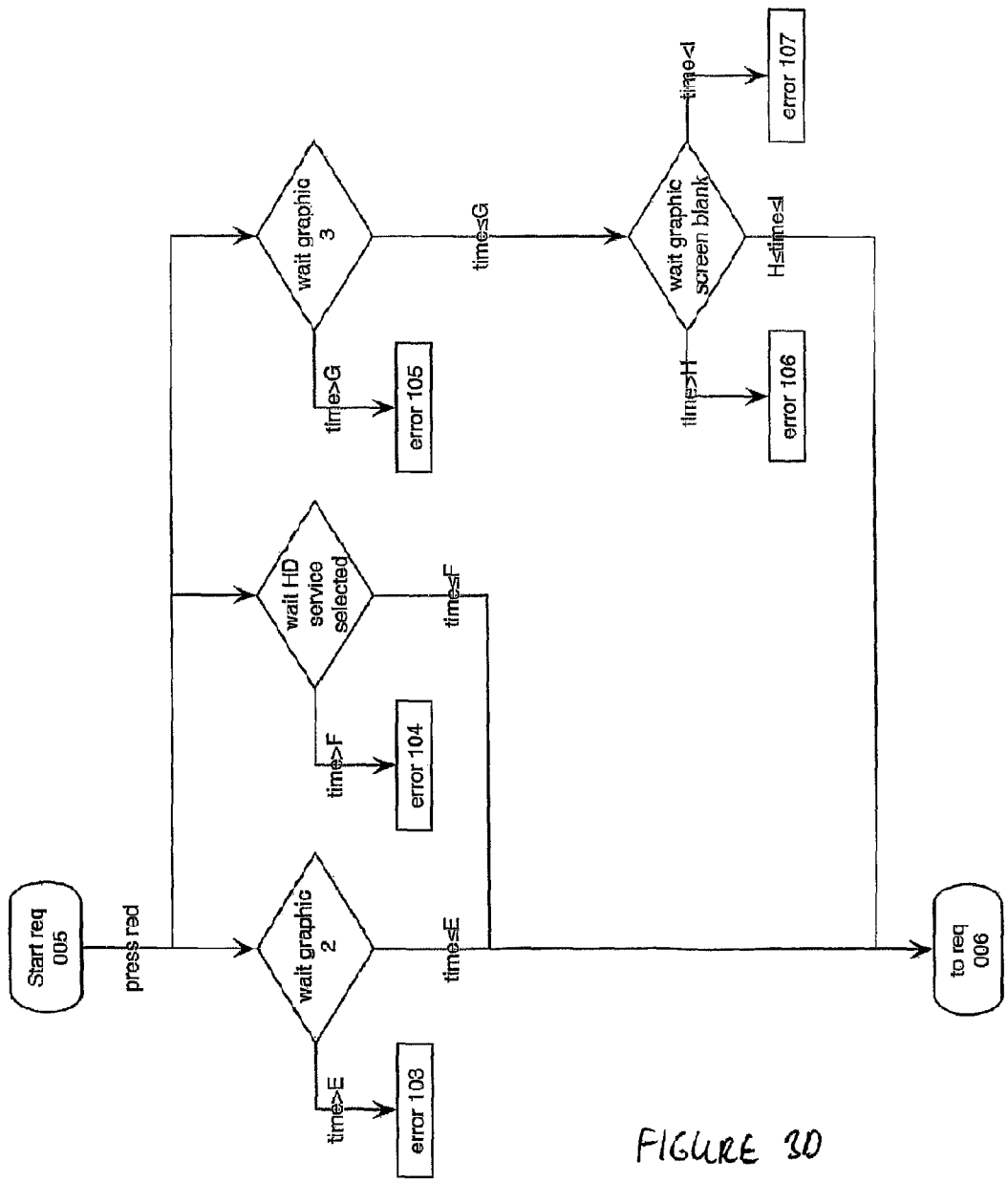
Figure 3E:
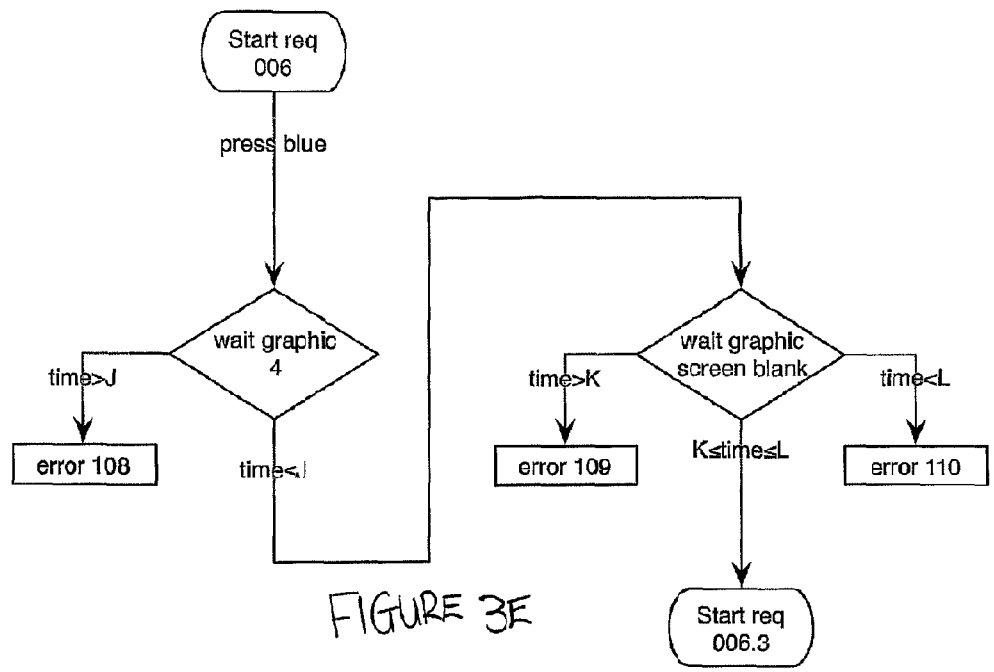
Figure 3F:
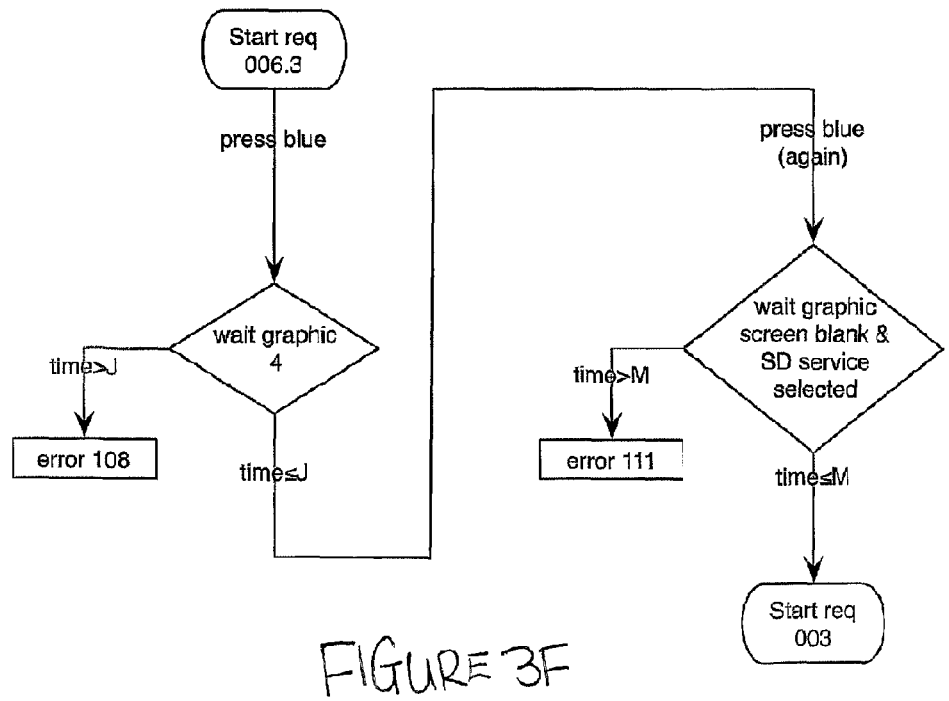
Figure 3G:
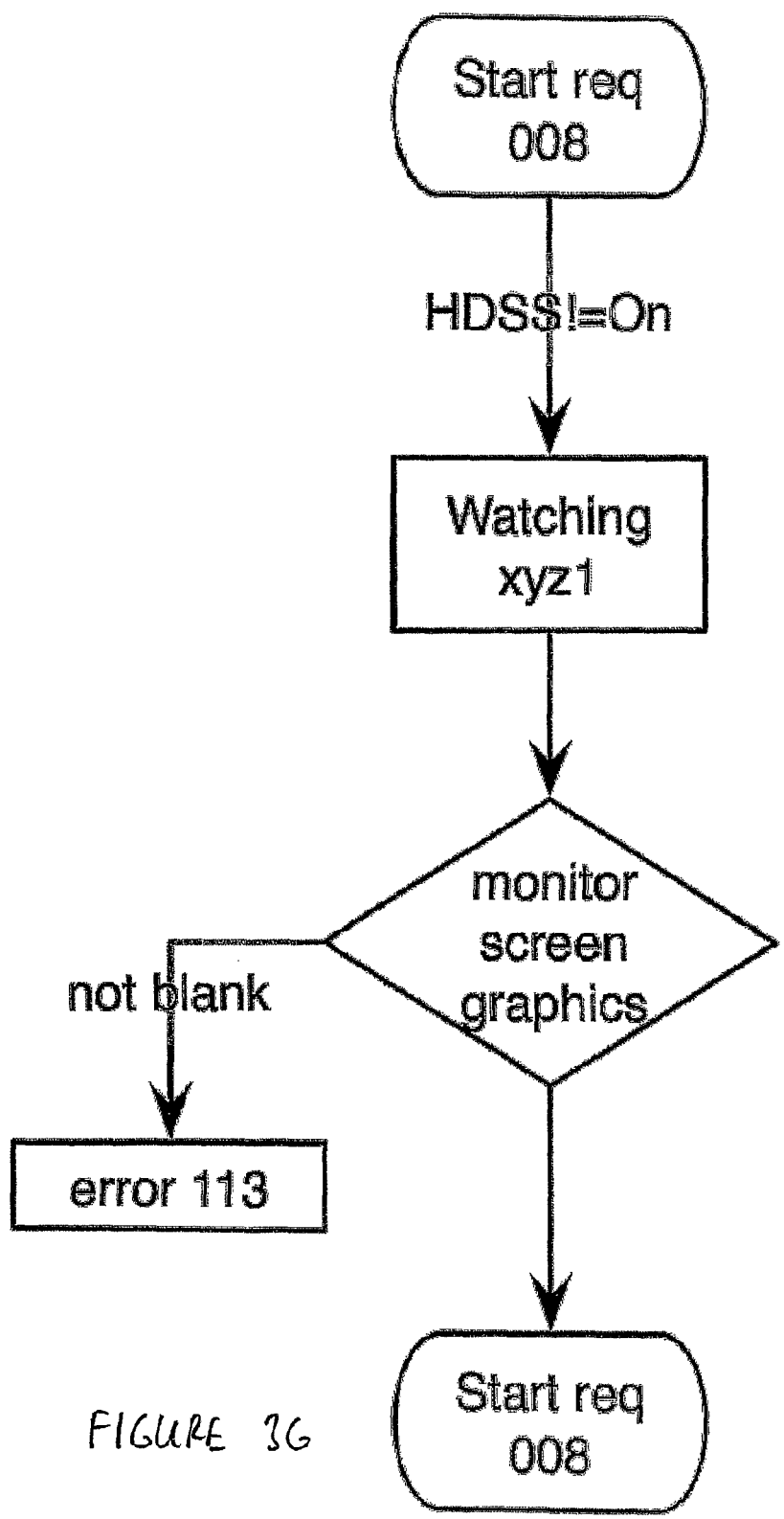
Figure 3H:
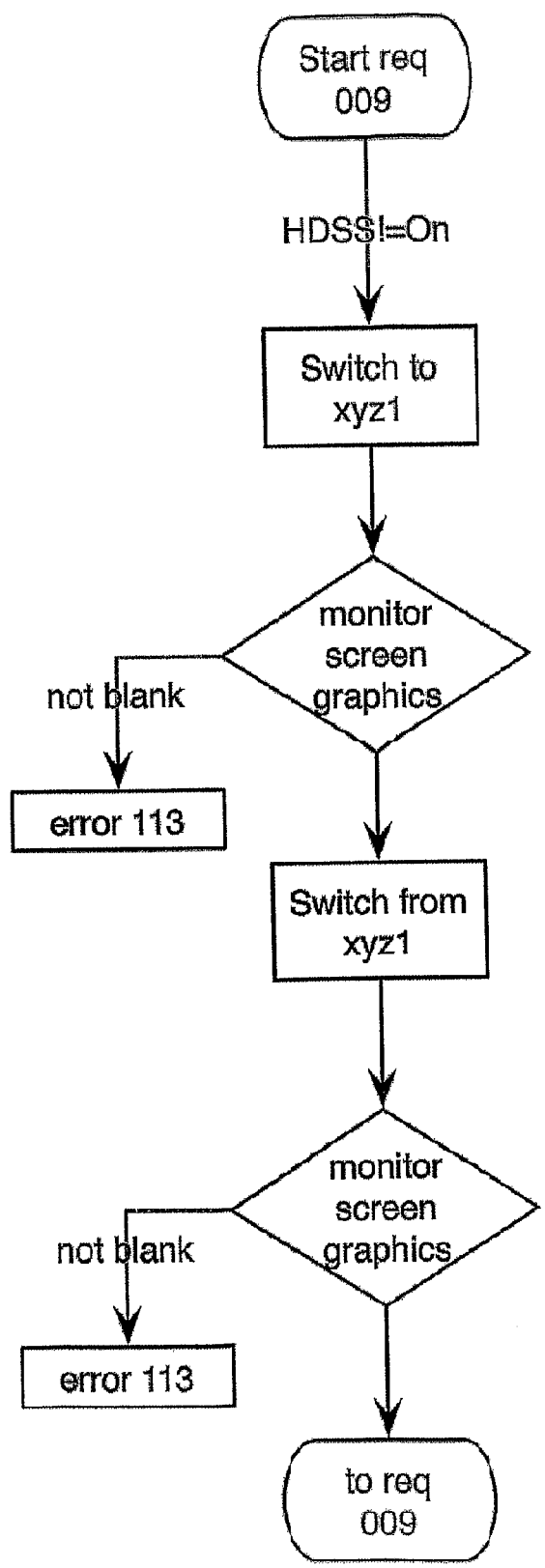
Figure 3I:
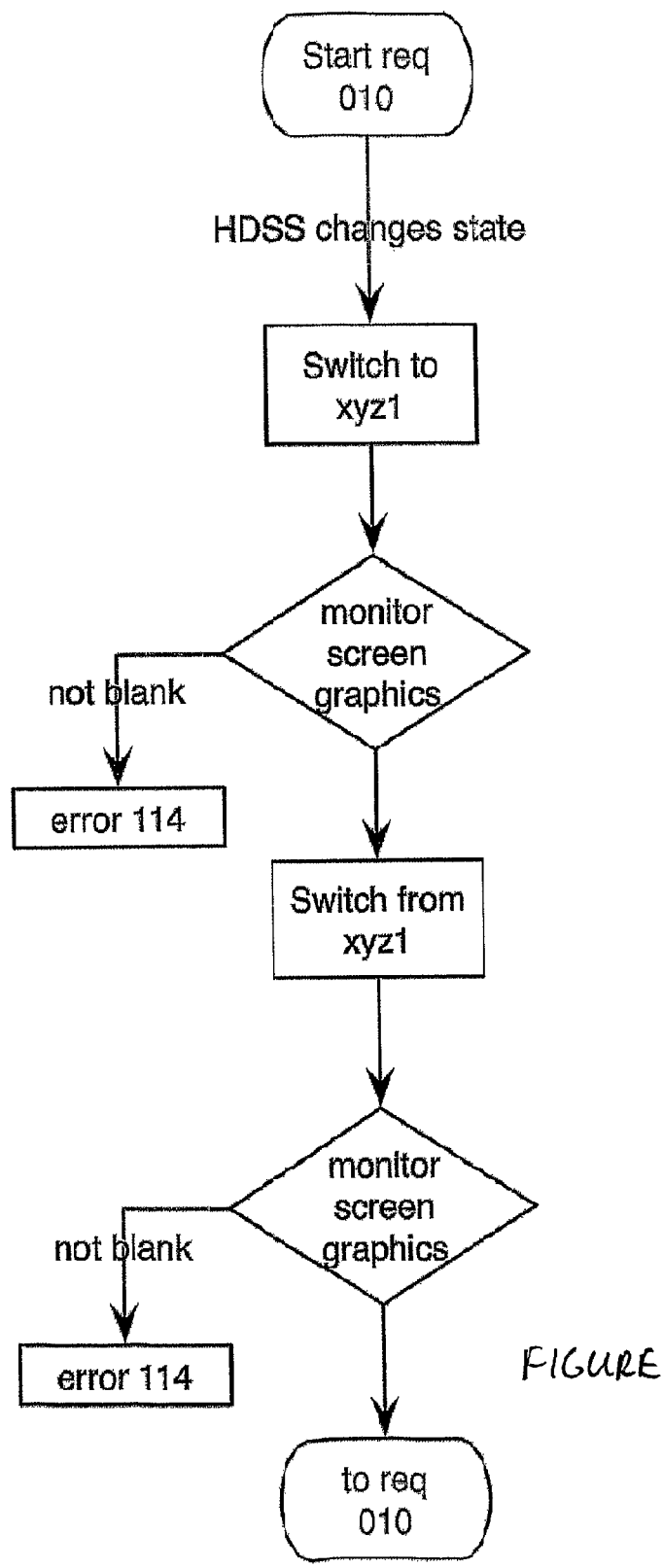

References:
Overview
The monitoring system is summarised in FIG. 1.
The key components are:
ASI inputs×6: sufficient to allow the current XYZ TS (television signal or transport stream or MPEG transport stream) to be monitored.
Demux: centralised demux (demultiplexer) service for the SI database and the monitoring receiver instances.
SI database: SI aware service used by the receiver instances.
Monitoring receivers: multiple instances of virtual receivers.
Each integrates: RedKey2 (the S&T (the applicant's MHEG-5 engine used in many receivers); Receiver infrastructure (demux, graphics etc.); Emulation of user behaviour (channel change, press red key etc.); Configuration of test case.
Test manager: instantiates inputs, demux and monitoring receiver instances and consolidates results from them. It is informed by the automation input.
Web (World Wide Web) UI: presents status information via a web UI.
Automation input: signals control monitoring in parallel to OC streaming Switching Application Verification This section describes the XYZ HD switching application and the tests that shall be performed to confirm its correct operation.

Description of XYZ HD Switching Application

HD Receivers

When XYZ 1 is selected, if there is an HD viewing option, then a red button prompt is displayed. If the user does not respond to the prompt then the prompt is removed. If the user presses the red button (whether the prompt is displayed or not) a transition to the HD service is initiated.

The HD transition takes the following form: Full screen graphic is displayed transiently; HD video is displayed with a blue button prompt (to return to SD) that is displayed briefly and then removed; and if the viewer presses the blue button while watching the HD service (whether the prompt is displayed or not) they are returned to their original XYZ 1 SD selection.

At the end of the HD event, viewers are returned to the SD content (the same XYZ region as they started from).

SD Receivers

When XYZ 1 is selected no on screen graphics are presented regardless of whether there is an HD viewing option or not.

XYZ Regionality

There are 32 potentially distinct XYZ 1 SD regions. Correct operation for SD and HD receivers should be verified in each of these regions. For example, the receiver should return to the correct XYZ SD service on return from the HD service.

What Needs to be Verified

Graphics

The graphics that are verified in this example are illustrated in FIG. 2.

Conformance Parameters

These conformance parameters embody allowed delays in the broadcast chain, receiver response etc. For example, when the HD state signal changes from inactive to active it will take some time for the object carousel system to encode the change and then for the receiver to detect and respond to the change.

| Parameter name | Description |
| --- | --- |
| A | Maximum allowable time from "start" for graphic 1 (the "HD available prompt") to be displayed when XYZ already being viewed. |
| B | While HDSS is active the max. allowable time after navigating to XYZ for graphic 1 to be displayed. |
| C | Minimum display time for graphic 1 if no key is pressed. |
| D | Maximum display time for graphic 1 if no key is pressed. |
| E | Maximum allowable time from pressing the red key to graphic 2 (the "HD loading" graphic) to be displayed. |
| F | Maximum allowable time for the transition to the HD service to complete after pressing the red key. |
| G | Maximum allowable time for graphic 3 to appear after pressing the red key. |

| Parameter name | Description |
| --- | --- |
| H | Minimum display time for graphic 3 if no key is pressed. |
| I | Maximum display time for graphic 3 if no key is pressed. |
| J | Maximum allowable time for graphic 4 to appear after pressing the blue key. |
| K | Minimum display time for graphic 4 if no key is pressed. |
| L | Maximum display time for graphic 4 if no key is pressed. |
| M | Maximum allowable time for the transition to the SD service to complete after pressing the blue key. |
| N | Maximum allowable time for graphic 5 to appear after "end". |
| O | HD deactivation after "end" |
| P | Maximum allowable time for the transition to the SD service to complete after "end". |

Interactive Behaviour Error Codes

| Error case | Description |
| --- | --- |
| 100 | Graphic 1 is not presented soon enough |
| 101 | Graphic 1 is not presented for long enough |
| 102 | Graphic 1 is presented for too long |
| 103 | Graphic 2 is not presented soon enough |
| 104 | HD service is not selected soon enough |
| 105 | Graphic 3 is not presented soon enough |
| 106 | Graphic 3 is not presented for long enough |
| 107 | Graphic 3 is presented for too long |
| 108 | Graphic 4 is not presented soon enough |
| 109 | Graphic 4 is not presented for long enough |
| 110 | Graphic 4 is presented for too long |
| 111 | Correct SD service is not selected soon enough |
| 112 | Graphic 5 is not presented soon enough |
| 113 | Graphic is presented when HD not active |
| 114 | Graphic is presented on a receiver that is not HD capable |
| 115 | Graphic is presented during HD viewing |

Testable Requirements and Responses

Testable Requirements and Responses at the HD Receiver (HD Receiver Test Cases)

| Req. Code | Description | Error code |
| --- | --- | --- |
| 001 | Automation signal changes state. Log the times of "start" and "end". | |
| 002 | For a viewer who is already watching XYZ then graphic 1 (the "HD available prompt") shall be presented within A second of "start". If the prompt appears log the time. Enter error state if the graphic does not appear in the specified time. | 100 |
| 003 | While HDSS is active when the viewer navigates to XYZ then graphic 1 shall be presented within period B. Enter error state if the graphic does not appear in the specified time. | 100 |
| 004 | After graphic 1 has been presented it shall remain presented for at least period C (unless a key is pressed). Enter error state if the graphic does not remain the specified time. | 101 |
| 004.1 | After graphic 1 has been presented it is removed within period D (unless a key is pressed) Enter error state if the graphic is not removed in the specified time. | 102 |
| 005 | When XYZ is the selected service then from "start" + A until "end" pressing the red key shall cause a transition to HD to start. Graphic 2 shall be presented within period E. Enter error state if the graphic does not appear in the specified time. | 103 |
| 005.1 | Continuing 005. The HD service shall successfully be selected for decoding within period F of pressing the red key. Successful selection requires the following: selection of an available service on the home transponder. | 104 |

| Req. Code | Description | Error code |
| --- | --- | --- |
| | Enter error state if an HD service is not selected in the specified time. | |
| 005.2 | Continuing 005. Graphic 3 shall be displayed within period G of pressing the red key. Enter error state if the graphic does not appear in the specified time. | 105 |
| 005.3 | Continuing 005. After graphic 3 has been presented it shall remain presented for at least period H (unless a key is pressed) Enter error state if the graphic does not remain the specified time. | 106 |
| 005.4 | Continuing 005. After graphic 3 has been presented it is removed within period I (unless a key is pressed). Enter error state if the graphic is not removed in the specified time. | 107 |
| 006 | While the HD service is selected. If the blue key is pressed graphic 4 shall be presented within period J. Enter error state if the graphic is not presented in the specified time. | 108 |
| 006.1 | Continuing 006. After graphic 4 has been presented it shall remain presented for at least period K (unless a key is pressed) Enter error state if the graphic does not remain the specified time. | 109 |
| 006.2 | Continuing 006. After graphic 4 has been presented it is removed within period L (unless a key is pressed) Enter error state if the graphic is not removed in the specified time. | 110 |
| 006.3 | Continuing 006. While graphic 4 is displayed press the blue key (for a second time). The receiver shall transition to the original SD XYZ service that was being watched and all graphics shall be removed within period M. Enter error state if the original SD service is not selected in the specified time. | 111 |
| 007 | While the HD service is selected graphic 5 shall be presented within period N of "end". Enter error state if the graphic does not appear in the specified time. | 112 |
| 007.1 | Continuing 007: The receiver shall transition to the original SD XYZ service that was being watched within period P. Enter error state if the original SD service is not selected in the specified time. | 111 |
| 008 | For a viewer who is already watching XYZ then no graphics shall be presented from "end" + O until "start". Enter error state if the graphic appears in the specified time. | 113 |
| 009 | When the viewer navigates to XYZ at any time after "end" + O then no graphics shall be presented before "start". Enter error state if the graphic appears in the specified time. | 113 |
| 011 | While the HD service is constantly selected, from the time that graphic 3 is removed (shortly after the service is selected) until graphic 5 is presented (when the HD service is finishing) no other graphics shall be displayed. Enter error state if the graphic appears in the specified time. | 115 |

SD Receiver Test Cases

| Req. Code | Description | Error code |
| --- | --- | --- |
| 001 | Automation signal changes state. Log the times of "start" and "end". | |
| 010 | When the viewer navigates to XYZ at any time then no graphics shall be presented. Enter error state if the graphic appears in the specified time. | 114 |

FIG. 3A to 3H are flow charts illustrating receiver responses.

Monitoring Implementation

The previous section describes testable requirements on the XYZ HD switching application. This section describes how these requirements are tested.

Overview

Multiple virtual receivers shall be tasked in different ways to cover the range of tests across HD and SD receivers across the XYZ regions. It is envisaged that 3 distinct receiver tasks are required for each XYZ region.

HD Receiver 'A'

This receiver emulates a user with an HD receiver who watches XYZ 1 constantly and navigates to the HD alternative when it is offered and is returned automatically to their original SD service when the HD programme ends.

This allows the following requirements; defined above, to be verified:

001, 002, 005*, 007*, 011

HD Receiver 'B'

This receiver emulates a user with an HD receiver who frequently changes channel from and to the XYZ 1 SD service and in various patterns navigates to the HD service and back to the SD service.

This allows the following requirements, defined above, to be verified:

001, 003, 004*, 005*, 007*, 008*

SD Receiver 'C'

This receiver emulates a user with an SD receiver who frequently changes channel from and to the XYZ 1 SD service.

This allows the following requirements to be verified:

001, 010.

Other Error Causes

The above clauses address tests to monitor the operation of the MHEG-5 interactive aspects of the XYZ services. Additionally there are error mechanisms that prevent the correct operation of the interactive tests. For example: failures in physical delivery of the MPEG data to the monitoring system; connection to incorrect signal sources; and gross errors in the service signalling.

Non-Interactive Parameters

| Parameter name | Description |
| --- | --- |
| AA | TS bit-rate lower limit |
| AB | TS bit-rate upper limit |
| AC | Required number of MHEG-5 interactive services |

Non-Interactive Error Codes

| Error case | Description |
| --- | --- |
| 200 | Error in physical connectivity (TS bit rate is out of range AA to AB). |
| 201 | Error in service signalling (cannot identify AC MHEG-5 interactive services). |
| 202 | No connection to automation control system (if protocol allows this to be determined). |

SI Calibration

The monitoring system requires an SI database that is aware of the channel map.

The monitoring system can automatically derive the SI database from its inputs or by other methods such as manual entry.

Hardware and Physical Interfaces

Host Computer

The monitoring host is a HP DL360 G5 1U rack-mount server which has a 2.8 GHz QC Xeon processor, 10 GB RAM, 3×72 GB RAID 5, Redundant PSU (power supply unit), and Red Hat Enterprise Linux v4.

Physical Interfaces

Transport Stream: 6×ASI inputs (copper, BNC)
Network: 2× Ethernet (RJ45, Cat-5, 10/100/1000)
Management: 1× Ethernet
Local UI: VGA+USB connecting at front or back.

Logging and User Interface

User Interface

Figure 4:
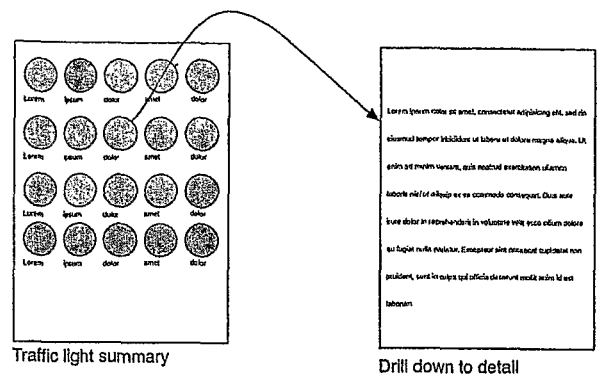
FIG. 4 is a schematic diagram of a user interface display for use with examples of the present invention.

The user interface shall be accessible from web browser with network connection to the monitoring computer. The first page of the UI shall present a visual summary of the state of the XYZ 1 regional variants and the gross health of the inputs to the system using a method such as traffic lights illustrated in FIG. 4. It shall be possible to navigate to a more detailed view of the state of each region.

Access Control

The UI for the monitoring system is intended for use from within a secure environment with suitably trained staff. As a consequence: There are no mechanisms to prevent multiple users accessing or controlling the system at the same time; and all users with access to the system UI are able to control the system.

Traffic Lights

The primary web page presents a matrix of "traffic lights". One light reflects the non-interactive error status (connectivity etc.). The remaining lights are organised with one light for each XYZ region.

4 colours are used for the lights giving the following indications depending on their status or colour:

Green: no error
Red: current error
Amber: error condition that is no longer present but has not been reset
Grey: other error makes this test irrelevant (e.g. input failure makes interactive tests irrelevant).

Each "light" has: a title (e.g. the XYZ region); and an indication of the health or error.

Clicking on a "light" leads to a textual status page related to the light.

Clear Errors

Error status shall be latching i.e. once an error has been detected the status shall either be red (to indicate a current error) or amber (indicating an error that has passed but is not yet reset). The UI shall allow all error states to be reset.

Client Requirements

The following browsers shall be verified and can be used with this system:

Internet Explorer 7; and Firefox 2 and 3

The client shall have Adobe FlashPlayer 8 plug-in or later installed.

Logging

At least following shall events shall be recorded: time at which the automation "start" signal is received; time at which the automation "end" signal is received; and time and description of errors.

Logging will be implemented by allowing log messages to be sent to a customer provided log server using an industry standard protocol such as syslog.

Example implementations of the system are discussed in more detail below.

Figure 5:
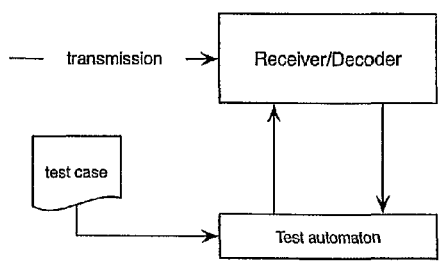
FIGS. 5, 6, 7A to 7C, and 8 are schematic diagrams illustrating systems for monitoring a data stream embodying examples of the present invention.

Efficient Implementation of Partial Receivers and Sharing of Common Services to Allow Many Receivers to be Efficiently Implemented on a Single Computer to Allow Many Concurrent Monitoring Activities One approach to monitor a data stream (such as a broadcast digital TV signal) is to implement a modified decoder for the aspect of the data stream that is to be monitored. For example, the interactive aspects of a TV signal can be tested by associating an interactive decoder (for example a UK MHEG-5 engine) with functions to test the responses of the interactive decoder to the broadcast signal. Similarly, a system for testing correctness of a subtitle transmission would associate a subtitle decoder with functions to test its operation (see FIG. 5, which illustrates a Generic TV receiver and test automaton).

Figure 6:
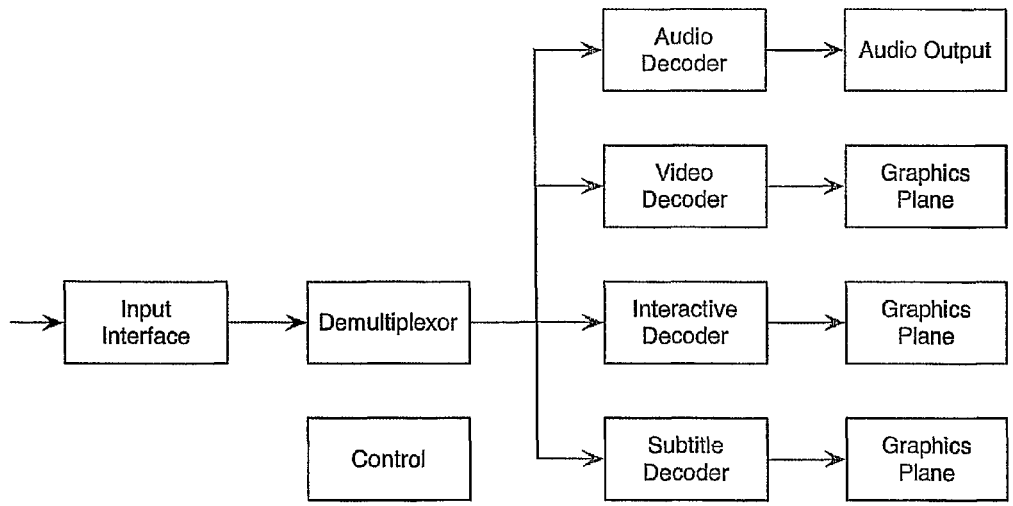

A digital TV receiver includes multiple decoders decoding specific aspects of the TV data (see FIG. 6, which illustrates a generic TV receiver). These decoders have dependencies on other components. There is the processing on the data stream (input interface and demultiplexor) leading to the decoder of interest. More subtle are the interactions between the decoders. For example, the interactive decoder may have control over the operation of the Video and Audio decoders (e.g. to present video scaled down in to a quarter of the screen) and control over the overall activity of the receiver (e.g. channel selection).

In a multichannel TV environment, there are multiple TV services within a single RF TV signal. Each TV service may have multiple aspects that should be monitored concurrently. For example a TV service might have subtitles in multiple languages each of which should be monitored.

Implementing an apparatus to concurrently monitor several aspects of multiple TV services within the same digital signal requires many TV receiver implementations. If full generic TV receivers are implemented this is onerous and potentially impractical or economically unattractive to implement.

Figure 7A:
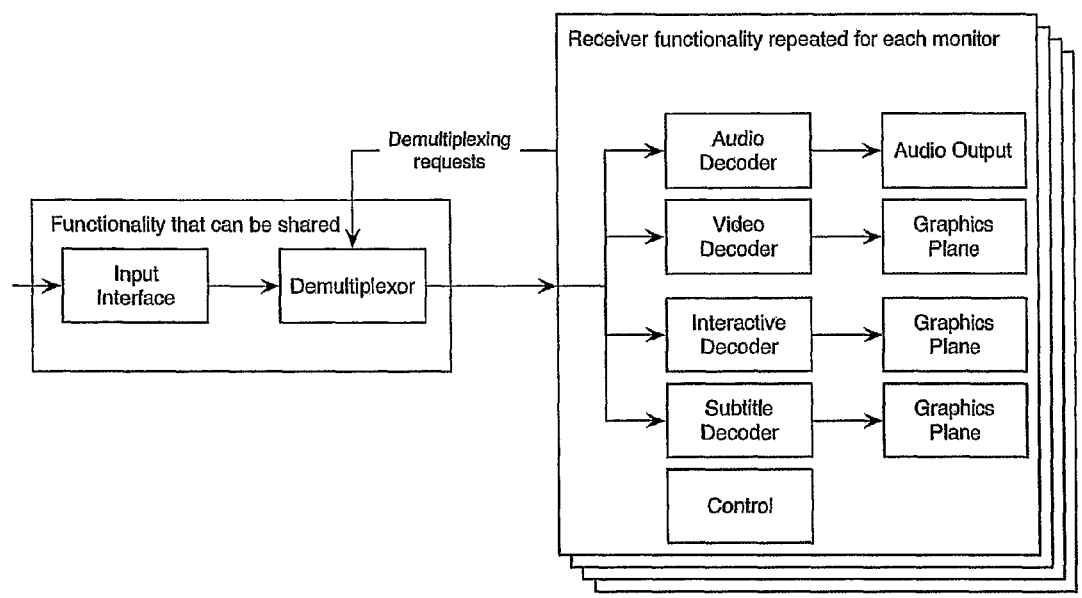

For a given monitoring application many of the components of the receiver implementations are essential but are inefficiently replicated if there are multiple receiver implementations. While other components may only require a skeleton implementation (see sharing resources illustrated in FIG. 7A) here we recognise that the input and demultiplexor functions can be a shared resource for multiple receivers. The computational resources required to implement these as a shared resource can be materially less than replicating the resource for each receiver instance (see the skeleton implementations of FIGS. 7B and 7C), here we recognise that for many monitoring tasks only a subset of the receiver's functionality needs to be fully implemented. As some of the receiver functions (particularly audio and video decoding) require significant computational resources omitting or partially implementing these can greatly reduce the required computational capacity.

In the case of subtitle monitoring, the audio and video decoder are not required at all. The interactive decoder may need to be present if it has a potential capability to control the subtitle decoder.

Figure 7B:
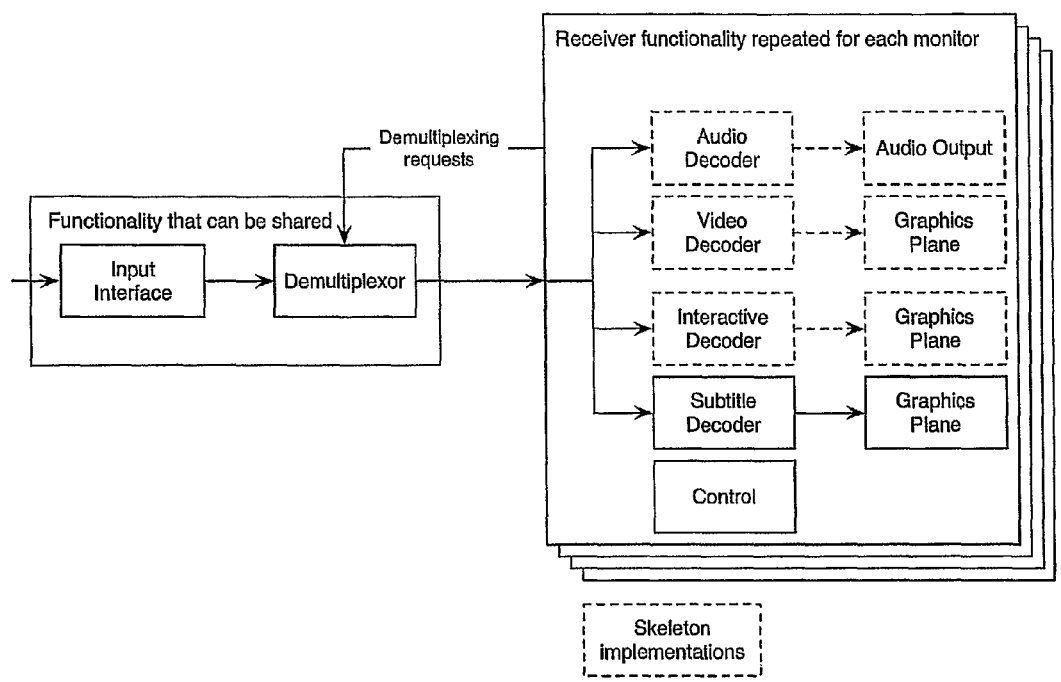
Figure 7C:
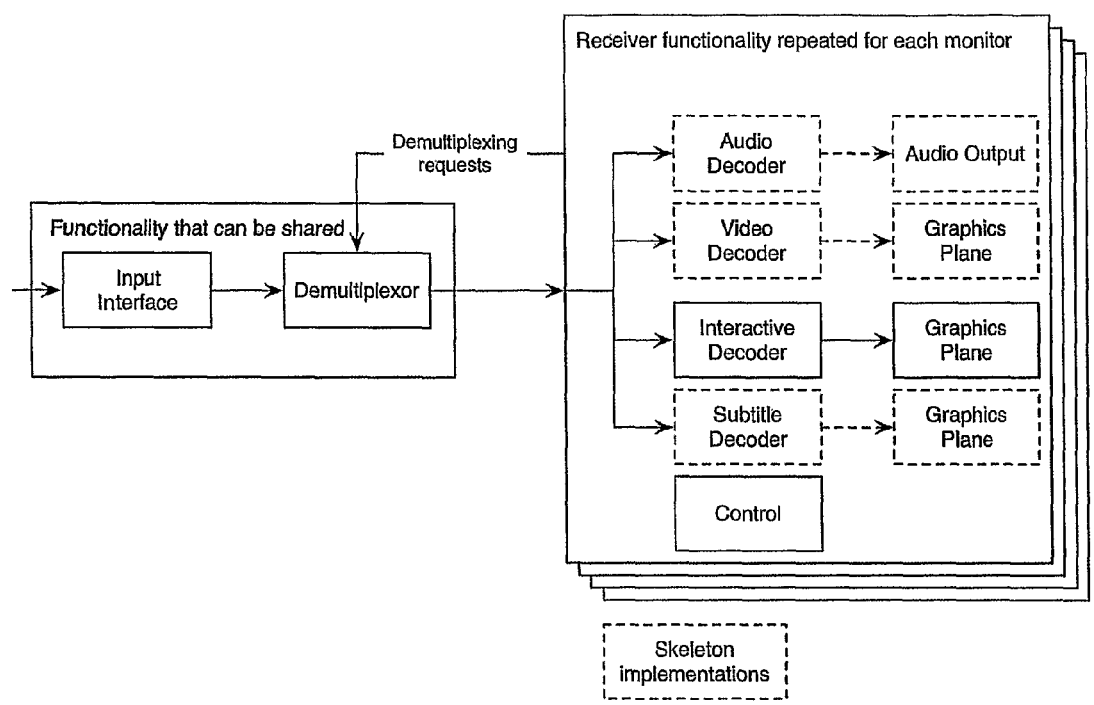
Figure 8:
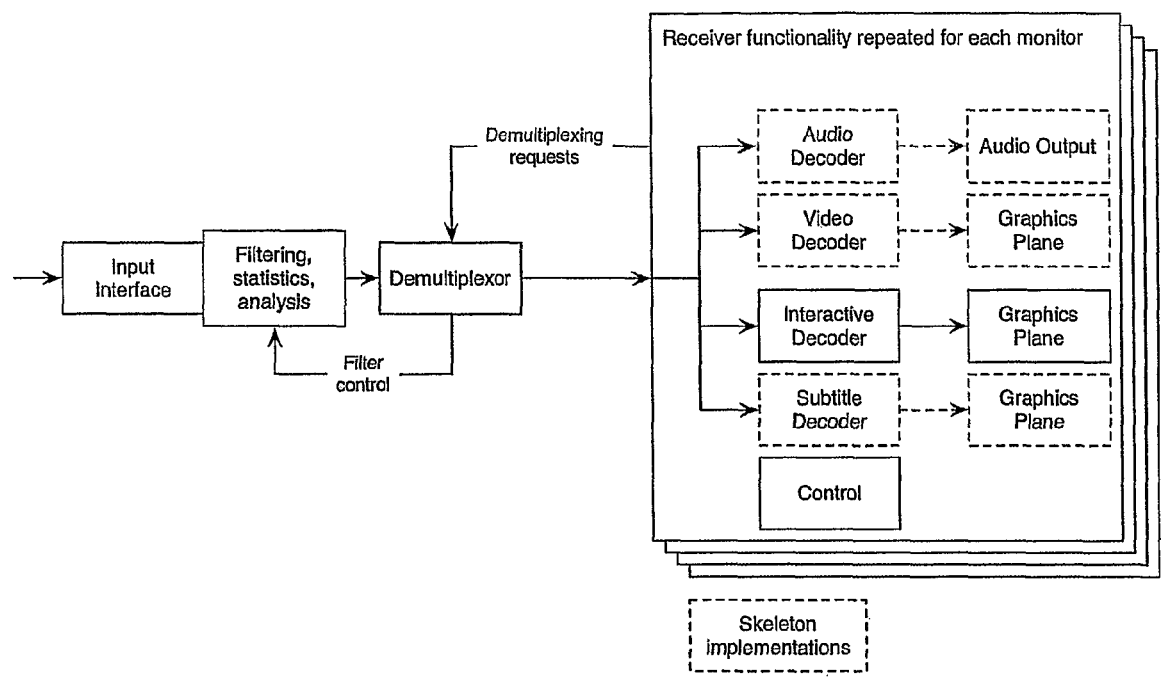

In the case of interactive monitoring, the audio and video decoder are not required to decode the media data. However, a validation function may be required to verify that media data is present if the interactive decoder has the capability to control media presentation and this operation needs to tested (see FIG. 8, which illustrates an example with filtering). A major potential burden on a system implementing multiple receivers is carriage of data through the system that is not required by the receivers. For example a digital transmission might be 30 mega bits per second. If this carries 8 TV services and, for example, 4 monitoring receivers are required to perform different tests on each TV service then a naïve implementation would need to deliver 30 mega bits per second to each of 32 receiver implementations. Using skeleton receiver implementations (as illustrated in FIGS. 7B and 7C) removes the need to decode this data. A further optimisation is to discard data not required for the receiver's monitoring requirement. If the receivers are monitoring an aspect such as subtitles or interactivity only a small minority of the transmitted data is required by these receivers. For efficiency, the data not required should be discarded as close as possible to the system's input interface.

Analysis of the inputs can be made before data is discarded to provide services to the multiple receivers. Information on the validation of the media streams (audio and video) can be used by the multiple monitoring receivers. For example, if the receivers are monitoring interactivity they can use such validation information to determine if operations by the interactive service such as presenting media should be considered successful.

In summary:

Associating a test automaton with a receiver/decoder allows aspects of the signal to be monitored automatically.

In modern TV transmissions the number of services, and multiple aspects of these services are sufficiently numerous that it is often not technically or commercially attractive to implement the number of receivers required.

Sharing implementations of common functions between multiple receivers and providing just a skeleton implementation of functions (as illustrated in FIGS. 7B and 7C) that are not fully required greatly reduces the computer resources required to implement a large collection of receivers and so makes it practical to monitor a modern TV transmission on practical computer equipment.

Validation and then deletion of media components at the system input and then sharing this validation information with the receivers provides efficiency improvements as the high data rates associated with transporting these media components within the system are not encountered. This is particularly beneficial where multiple receivers monitor each service.

Method to Deliver Test Strategy to a Monitoring Equipment that Reduces System Complexity In this example, the test strategy for monitoring an interactive TV application embodies knowledge of the functionality required of the interactive TV application. In some cases, the interactive TV application changes frequently (for example interactive advertisements). To be effective monitoring equipment must employ the appropriate test strategy at the appropriate time.

Figure 9:
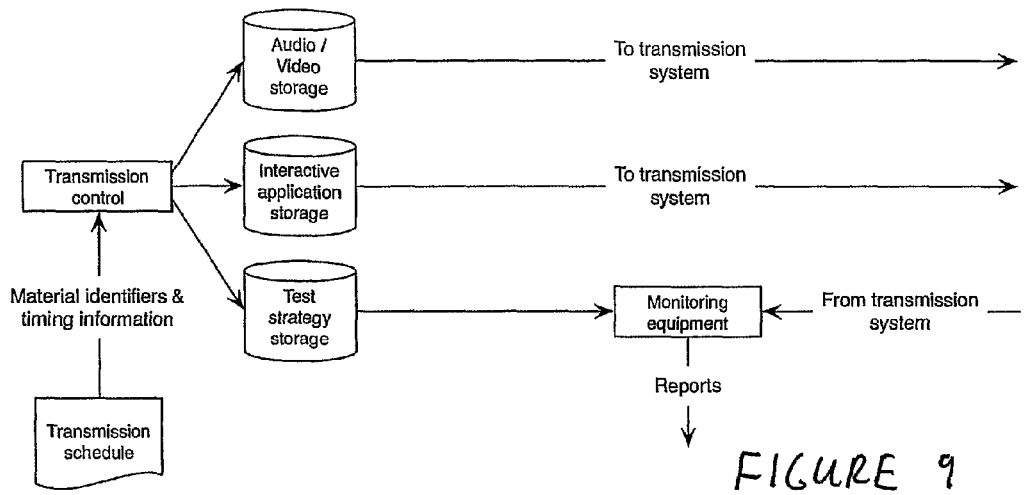
FIGS. 9, 10A to 10C, and 11A to 11C are schematic diagrams illustrating systems for delivering test strategy embodying examples of the present invention.

Ensuring that appropriate test strategies are employed by the monitoring equipment at the appropriate time requires flows of information to deliver the test strategy to the equipment and to synchronise its use with the transmission. Such communication is (a) a new requirement in transmission systems, (b) complex and (c) potentially a source of errors. (see automated test strategy delivery illustrated in FIG. 9).

The monitoring task can be partitioned in to three separate activities: (1) confirming the correct operation of the interactive application, (2) confirming the identity of the application, (3) confirming that the identified application was the one scheduled for that time.

If the test strategy is delivered in the broadcast data with the interactive application then the temporal association of the test strategy and the interactive application is assured. If the test functionality provides a mechanism to identify the interactive application then monitoring equipment can both identify the application and determine if it is functioning correctly.

Figure 10A:
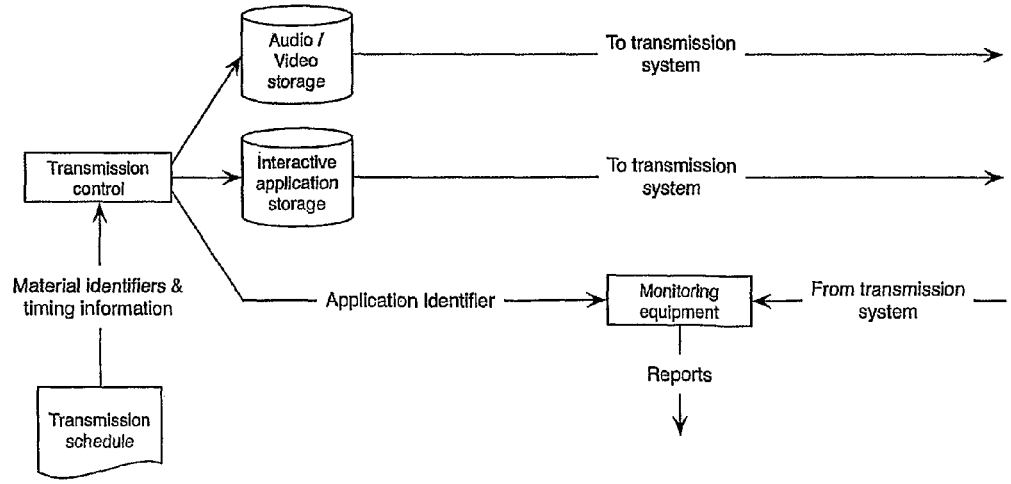
Figure 10B:
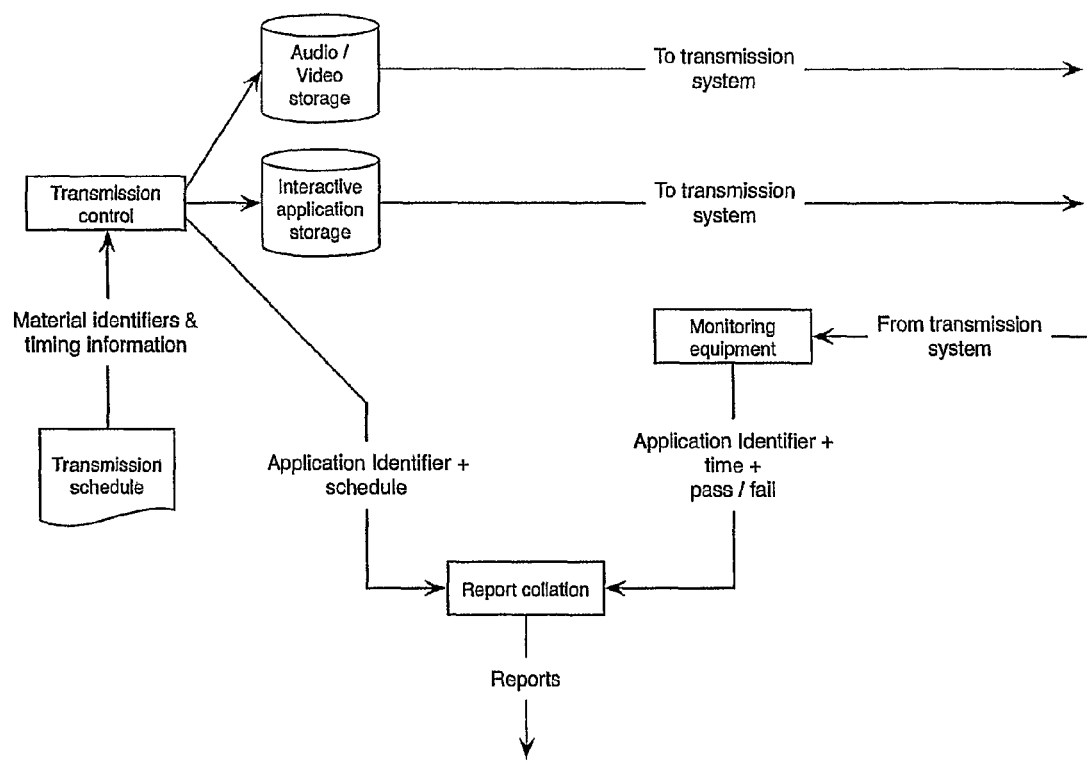
Figure 10C:
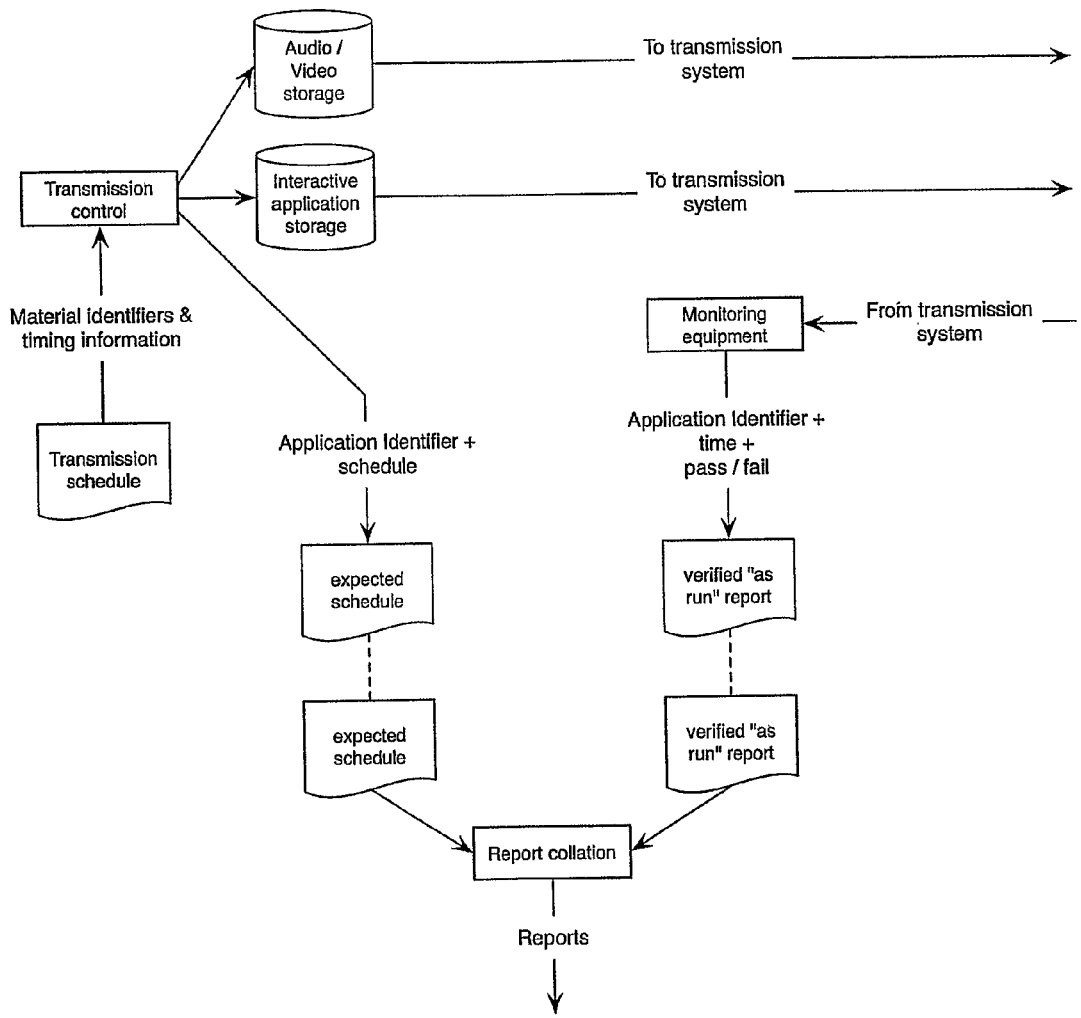

The comparison of the identity of the verified application can be done in a variety of ways (see the three variants of the test strategy delivery in stream illustrated in FIGS. 10A, 10B and 10C respectively). For example:

(a) As illustrated in FIG. 10A, the transmission control system can communicate the identity of the scheduled interactive application at the time of transmission to the monitoring equipment. The monitoring equipment can then report quickly if the application is both correctly functioning and has the correct identity for the schedule.

(b) As illustrated in FIG. 10B, the transmission control system can communicate information on application identity/schedule and the monitoring equipment can communicate information on application identity/success to a report collator. The report collator can then determine if the application is both correctly functioning and has the correct identity for the schedule.

(c) As illustrated in FIG. 10C, which is as (b) except no on-line communication is required between the transmission control system, the monitoring equipment and the report collator. Rather the transmission control system and the monitoring equipment send reports to the report collator from time to time allowing a batch process to report on success or failure retrospectively.

These options allow a trade-off between communication infrastructure and rapidity of reporting. (a) requires near instant communication between the transmission control system and the monitoring equipment and allows reporting of errors in real-time. In contrast, (c) can operate with infrequent exchange of information between the equipment involved but inherently delays awareness of errors. For example, scenario (c) might be applied where the monitoring location is remote from the transmission location and the priority is on auditing correct operation (rather than providing rapid feedback to prompt rectification of faults).

Figure 11A:
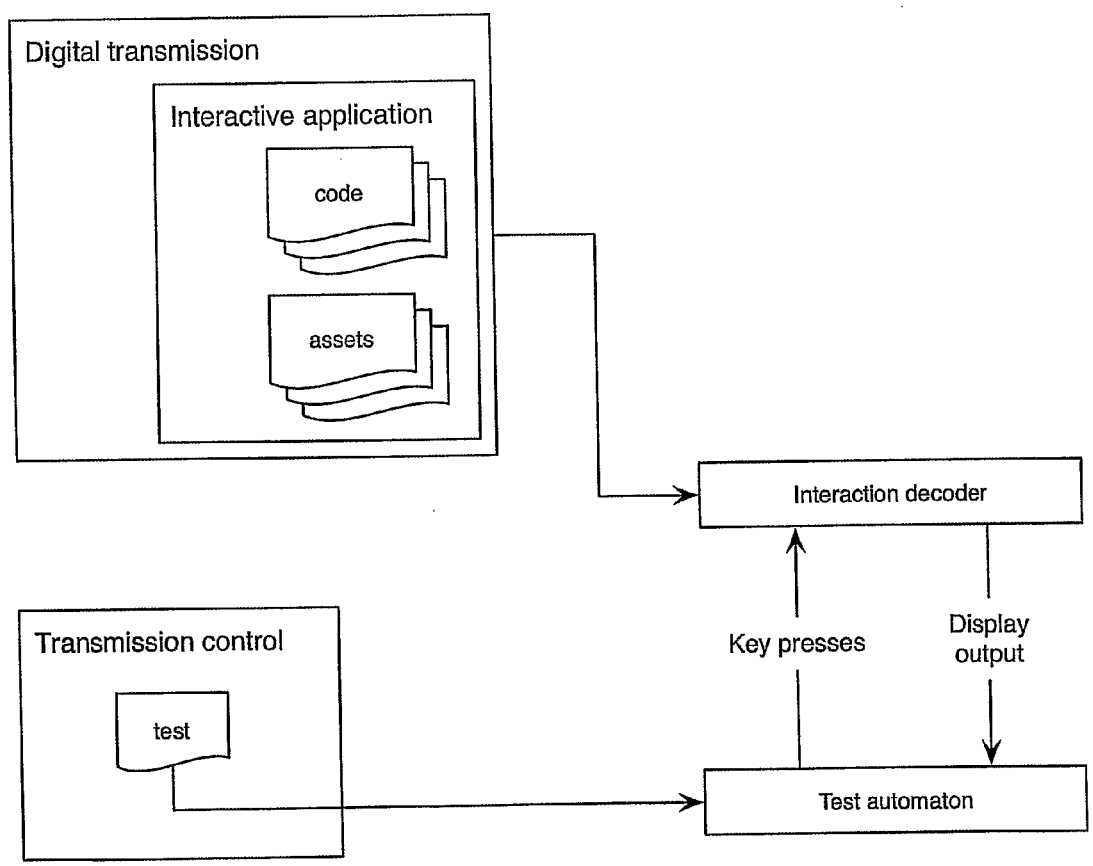
Figure 11B:
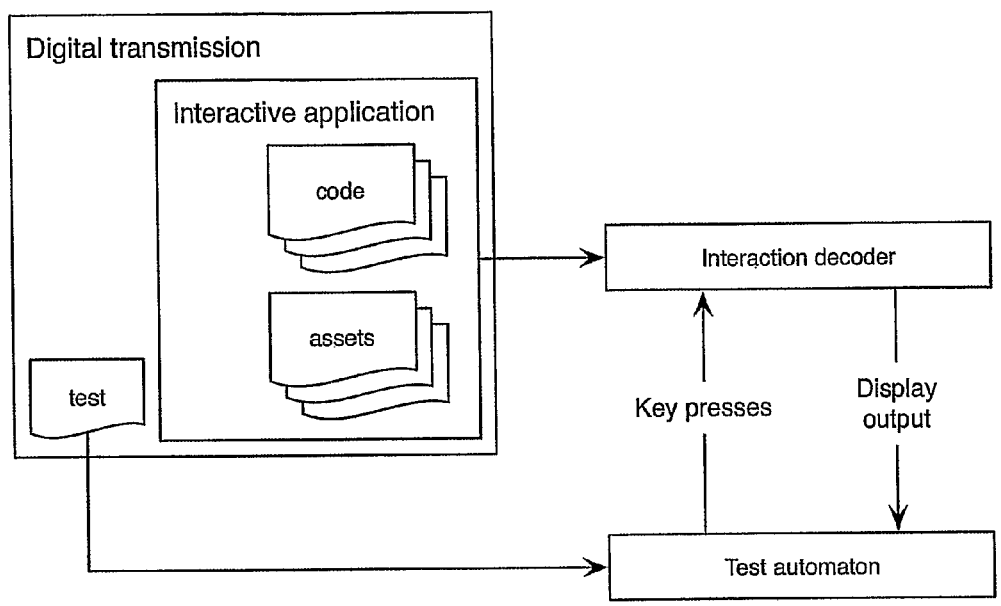
Figure 11C:
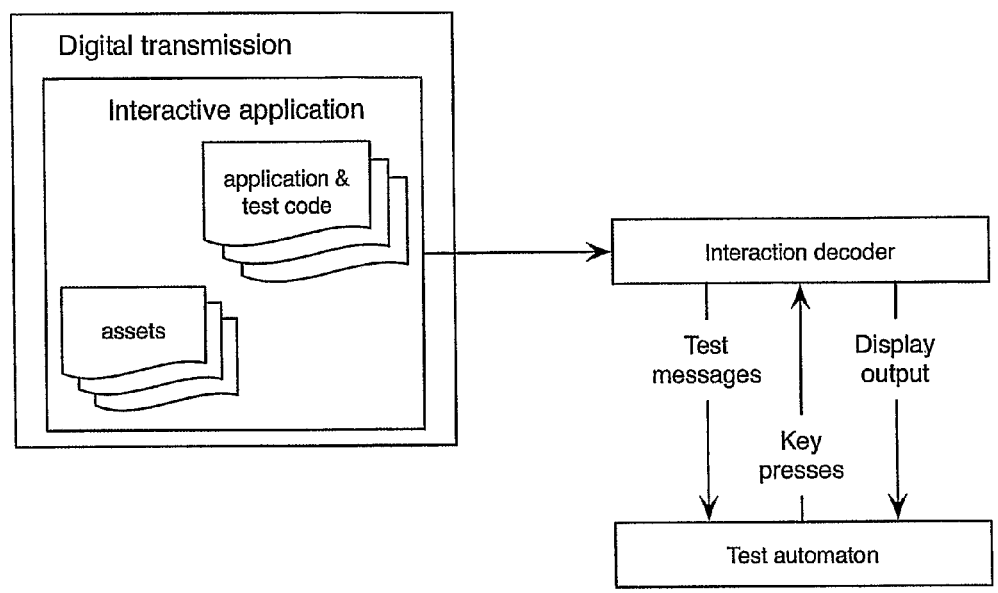

As illustrated in the carriage of test cases of FIGS. 11A to 11C, the carriage of the test strategy can be implemented in more than one way.

In the example implementation of FIG. 11A, the test strategy is communicated directly from the transmission control system. The communication between the interaction decoder and the test automaton can be as simple as key presses sent by the automaton to the decoder and display output sent from the decoder to the test automaton.

In the example implementation of FIG. 11B, the test strategy is carried in the digital transmission but not integrated in to the functionality of the interactive application that it is used to test. For example, the test strategy could be carried in a well known file in the same broadcast file system that carries the interactive application or alternatively it could be carried by some other mechanism in the digital transmission. This implementation provides carriage of the test case and enables the carriage of the test case to be synchronised to that of the interactive application. The relationship between the test automaton and the interaction decoder is the same as in the example of FIG. 11A.

In the example implementation of FIG. 11C, the test strategy is integrated with the functionality of the interactive application. An additional communication channel is introduced between the interaction decoder and the test automaton to deliver test messages and so communicate with and direct the test automaton.

The example implementation illustrated in FIG. 11C, is the preferred implementation.

The example implementation of FIG. 11C requires a communication channel for the interactive application to send data to the test automaton. The channel for this communication will depend on the technology of the interactive application and implementation of the interaction decoder.

Figure 12:
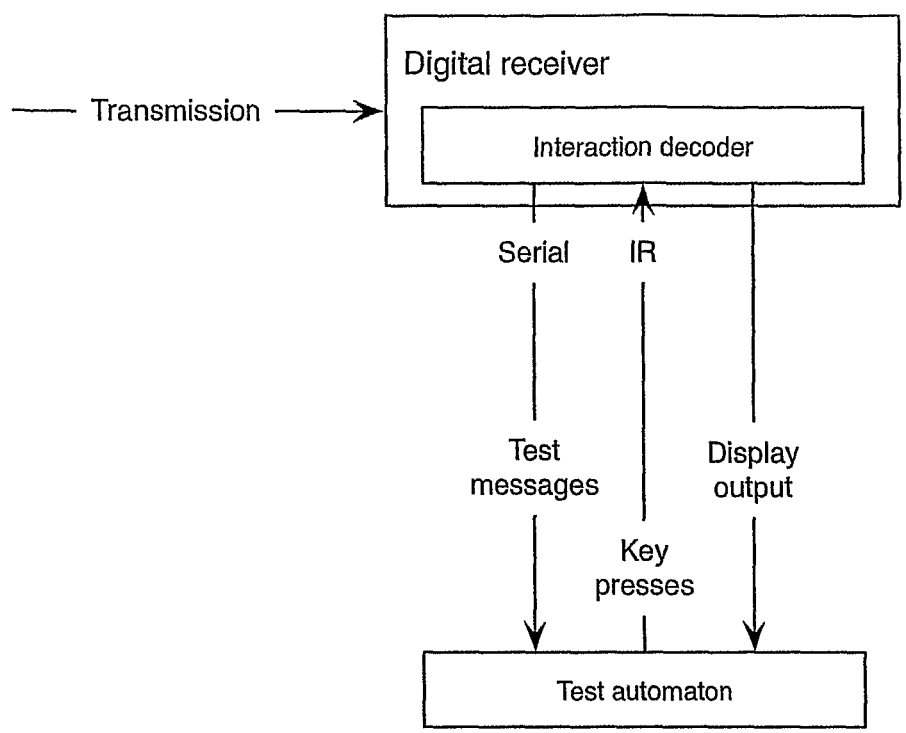
FIGS. 12 and 13 are schematic diagrams illustrating method for communicating test message embodying examples of the present invention.
Figure 13:
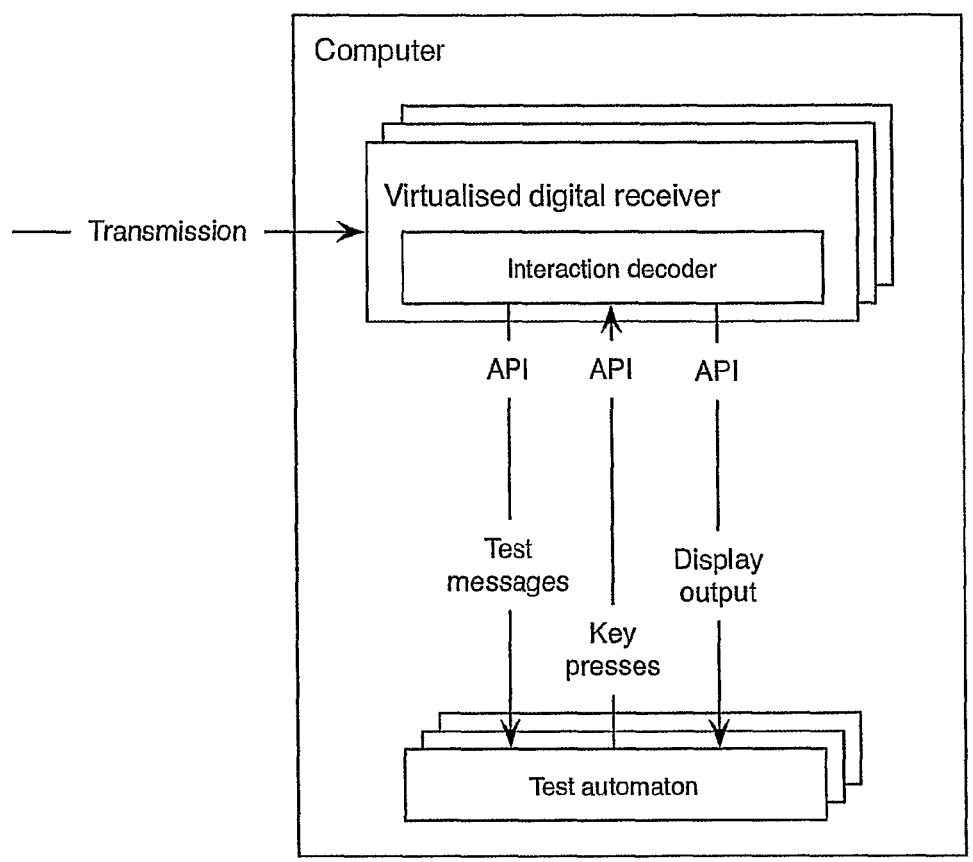

The physical method for the communication of test messages will depend on whether the interaction decoder is within a discrete digital receiver (see "Test message interface to discrete receiver" illustrated in FIG. 12) or virtualised on a computer along side the test automaton (see "Test message interface to virtualised receiver" illustrated in FIG. 13). In the first case of FIG. 12, a physical electrical interface (such as RS-232 serial, USB or Ethernet) is required from the receiver to the test automaton. In the second case of FIG. 13, an interprocess communication can be used between the virtualised receiver and the test automaton. This is the preferred implementation.

The method by which interactive application emits test messages will depend on the technology of the interactive application. For example, in the UK, a monitoring system would embed a UK MHEG-5 engine, the communication channel could be implemented as a new Resident Program or by adding an additional semantic to an existing Resident Program such as Debug. The method used does not need to be presented in the general population of receivers (i.e. consumer receivers). However, the method must not disturb the operation of the general population of receivers.

The message from the interactive application to the test automaton can be text and can be terse (to minimise broadcast cost). The following provides an outline of a possible message encoding.

General message format: a string containing short command or function names each separated/terminated by a semicolon character ";". The argument list for functions is enclosed in parenthesis. For example:

Ag(1,15,100);R;Am(app123.456,5,113);

The table below lists a possible set of commands and functions:

| Category | Command names (arguments) | Synopsis |
| --- | --- | --- |
| Remote control key press | RGBY | Colour keys (red, green, blue, yellow) |
| | 1 2 3 4 5 6 7 8 9 0 | Number key |
| | udlr | Direction keys (up, down left right) |
| | bt | Control keys (back/cancel, text) |
| | Pp | Program up (P+), Program down (P−) |
| Test functions | Am(message, time out, error) | Assertion, wait for a message "message" for timeout "timeout". If the expected message is not received then raise the error "error". |
| | Ag(graphic state, timeout, error) | Assertion, wait for a graphic state "graphic state" for timeout "timeout". If the expected graphic state is not achieved then raise the error "error". Graphic states are "0" for blank (i.e. no graphics drawn) or "1" for not blank (i.e. some graphics drawn) |
| | Ch(channel) | Select logical channel number "channel". Channel number "−1" conveys "not a channel". |
| | M(message) | Send the message "message" |
| | W(t) | Wait/pause "t" seconds |
| | Id(identity) | Report the identity of the application. Should be logged and compared with the planned transmission schedule. |

The following example describes a simple interactive application and the test features used to validate it.

Figure 14:
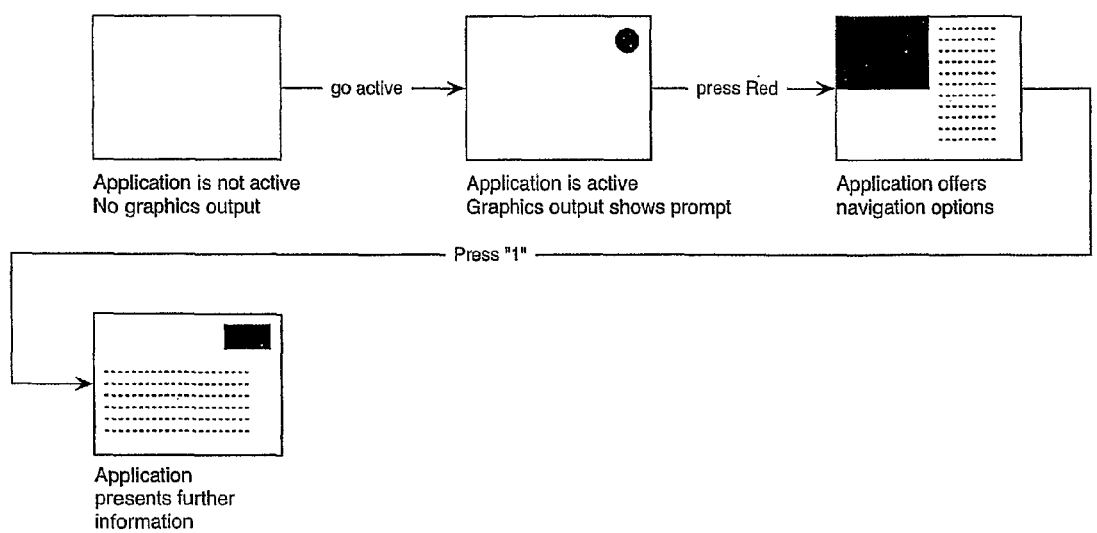
FIGS. 14 and 15 are schematic diagrams illustrating behaviour of an application embodying examples of the present invention.

Application description: when viewing the service when the application becomes active or after joining the service when the application is active a graphical prompt is presented inviting the viewer to press the Red key. If the Red key is pressed then the application can be viewed and navigated around. Changing TV channel terminates the application (see application behaviour illustrated in FIG. 14).

Testing description: when the application becomes active verify that a graphic is presented. Press the Red key. Press keys to navigate through the application. Verify the correct operation of an inner part of the application. Channel change away from the service carrying the application to terminate the application. Channel change back to the service carrying the application (and restart the test).

Figure 15:
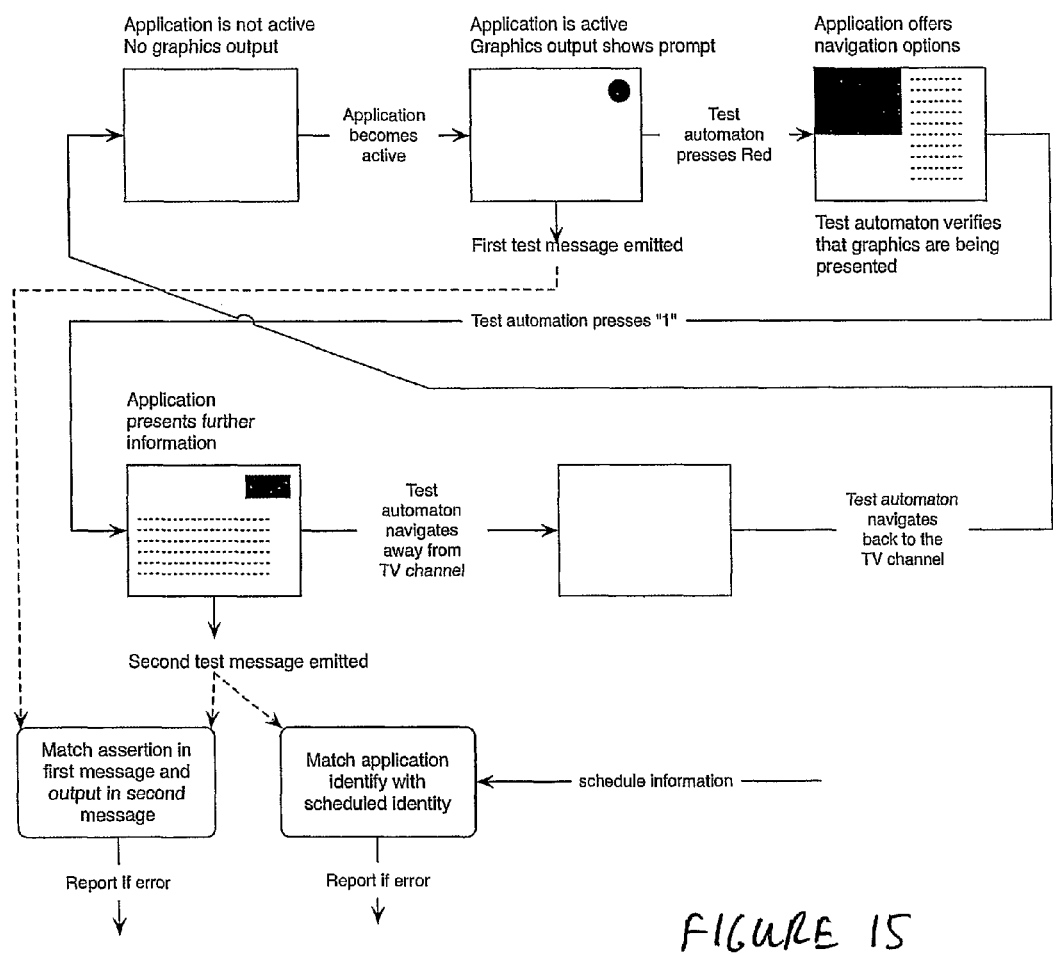

This testing can be implemented as follows (see application behaviour illustrated in FIG. 15).

When the application becomes active, or the TV channel is selected causing the application to be launched in the active state, the interactive application emits the following test message to the test automaton:

Ag(1,15,100);R;1;Am(app123.456,5,113);

This instructs the test automaton as follows:

Ag(1,15,100) assert that graphics should be presented within 15 seconds else report error 100

R Press the Red key

1 Press the "1" key

Am(abcde,5,113) assert that the application should do message M(abcde) within 5 seconds else report error 113

A second part of the application, reached by pressing the Red key followed by the "1" key, emits a second test message to the test automaton:

M(abcde);Id(app123.456);Ch(−1);W(10);Ch(103)

This instructs the test automaton as follows:

M(abcde) compare this message with the previous assertion. If it does not match then report the error specified in the assertion.

Id(app123.456) log the identity and compare it with the planned transmission schedule.

Ch(−1) channel change away from the current service

W(10) wait 10 seconds

Ch(103) channel change to channel 103 (this service)

The test designer uses the assertion Am( ) and the message M( ) in combination. If the invocation of M( ) just returns a static message then effect is just to confirm that the navigation (in this example, the press of the Red and "1" keys) was successful. The test can be made more valuable if the message returned by M( ) is computed in a manner that is sensitive to the correct operation of the application. For example, the message is computed based on the successful loading of assets used by the application or possibly using data values retrieved from those assets.

The test designer uses the identity function Id( ) to report the identity of the application to the test automaton. This identity can then be correlated with information from the planned transmission schedule. In the simple case, this can be a static value (for example an application identity code and version number). Alternatively, as with the assertion described above, the identity value can include information computed by the interactive application. For example, the identity value could include information retrieved from application assets. An example where this would be valuable is in regional TV broadcasting. If identity implies the TV region for which the application and its data are designed it becomes possible to verify both the correct application and the correct regional variation of the application.

The subsequent channel change functions Ch( ) cause the test automaton to change channel away from the service and then return to it. For interactive application platforms, such as UK MHEG-5, these channel changes cause the interactive application to terminate and then re-launch. This causes the testing cycle described above to restart. This regime thus repeatedly verifies the interactive application while it is active.

Subtitle Activity Monitoring by Quantifying Presence of Speech in Audio

Several common failure mechanisms in TV transmission of subtitles are: subtitle is missing, subtitle is present but not progressing, and subtitle is presented at the wrong time.

Figure 16:
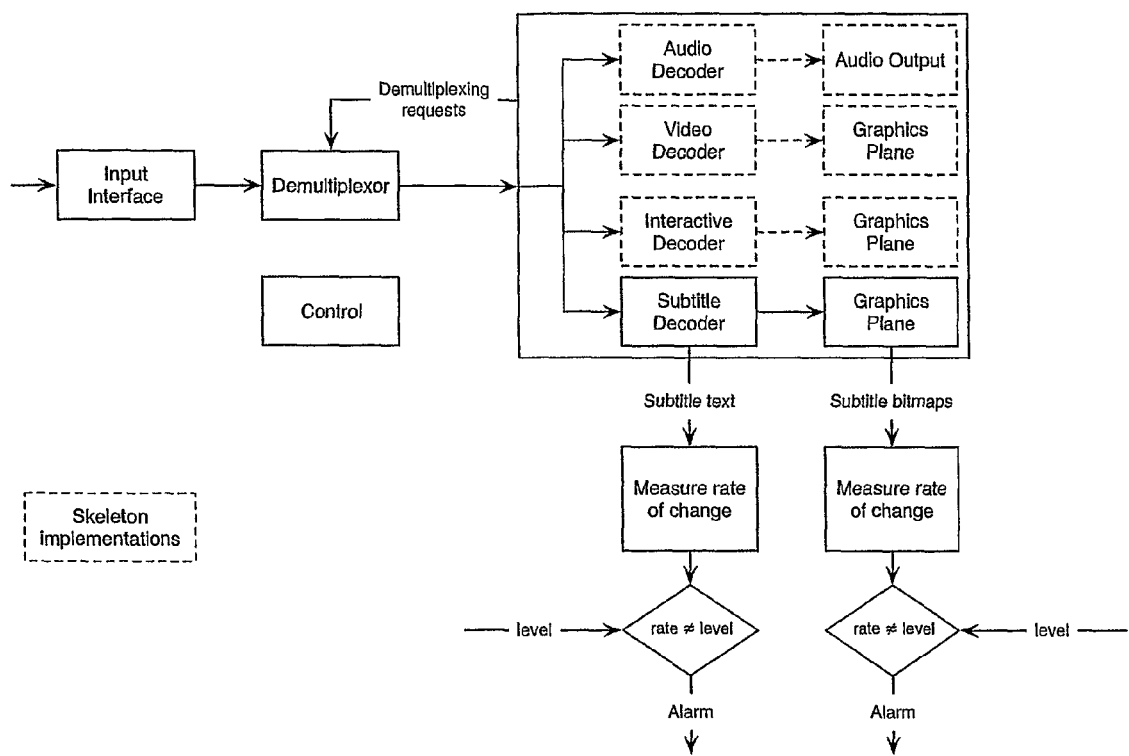
FIGS. 16 to 21 are schematic diagrams illustrating subtitle monitors embodying examples of the present invention.
Figure 17:
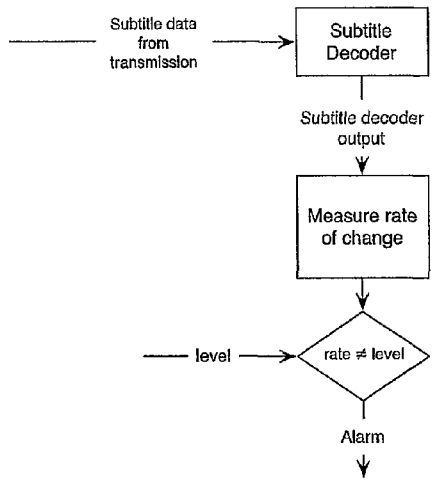

A first step in monitoring and detecting these errors is to implement a TV receiver/decoder with facilities to observe the activity of the subtitle decoder or the graphics plane that subtitles are written to (see the basic subtitle monitor illustrated in FIG. 16 and the basic subtitle monitor core illustrated in FIG. 17). The task of the subsystems is to observe the subtitle decoding and to look for changes in the subtitles being presented. If the rate of change of the presented subtitles varies significantly from a configured "rate of change" level then an alarm is generated.

However, the subtitle content of programmes varies widely (e.g. news may have almost continuous speech, while drama may have long periods of silence). So, configuring a single level such that the system is adequately sensitive but not at the same time excessively sensitive may not be a preferred arrangement for some programme types.

Figure 18:
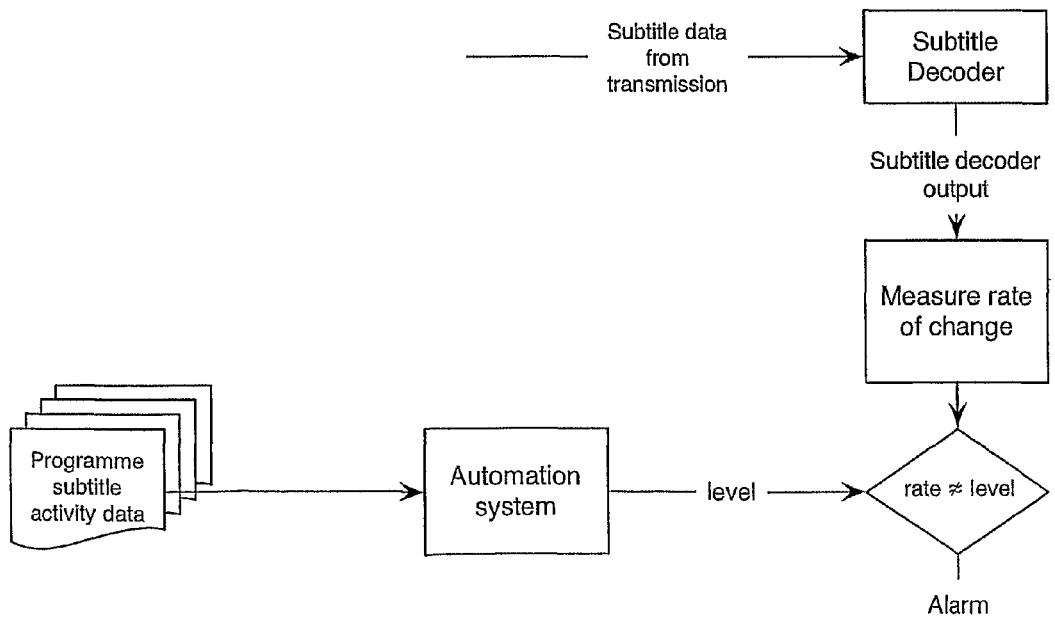

A system is envisaged where information on the expected level of subtitle activity is prepared for each TV programme and stored in the programme metadata. The transmission automation system could then communicate (or cause to be communicated) this information to the subtitle monitor to guide the threshold that it uses (see the subtitle monitor with metadata illustrated in FIG. 18). However, such quantification of the expected level of subtitle activity is not part of existing programme metadata. Also, there are likely to be cases where the level of subtitle activity varies significantly through the programme in which case a single level for the programme will not be sufficient.

Figure 19:
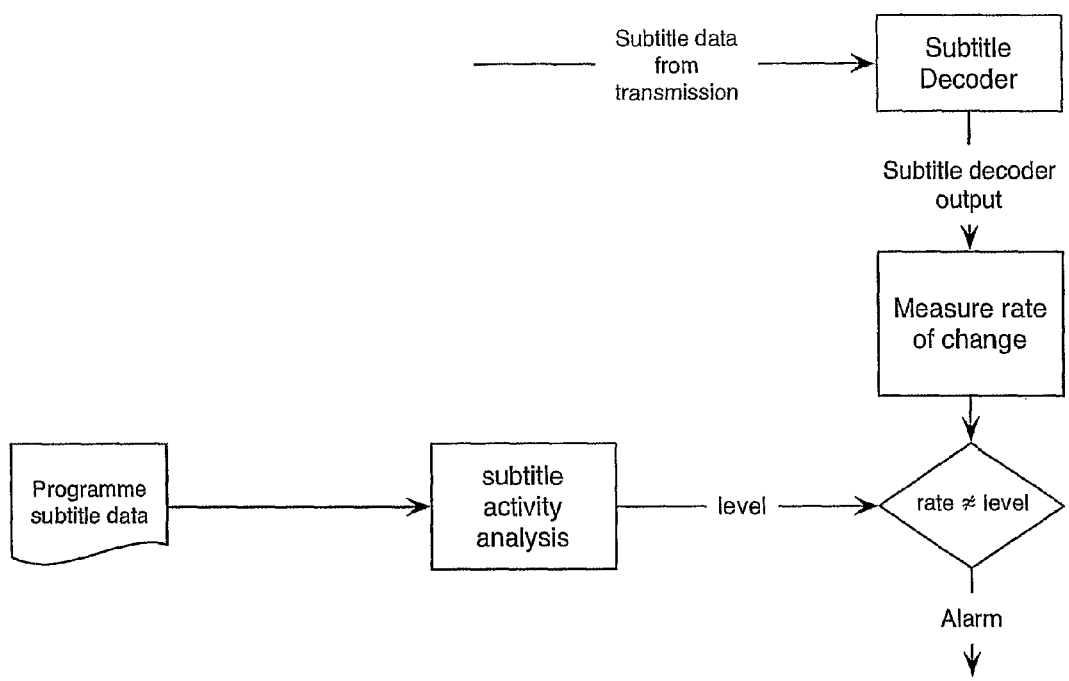

A variation of the previous scheme could be envisaged where the expected subtitle activity level is estimated from the subtitle data stored with the TV programme (see the subtitle monitor with derive level from subtitle data illustrated in FIG. 19). This can detect some errors in subtitle play-out and transmission but may be insensitive to others. For example, if the subtitle data stored with a programme is for a different edit, and so has a different time code sequence, then the monitor may not be able to detect an error.

Figure 20:
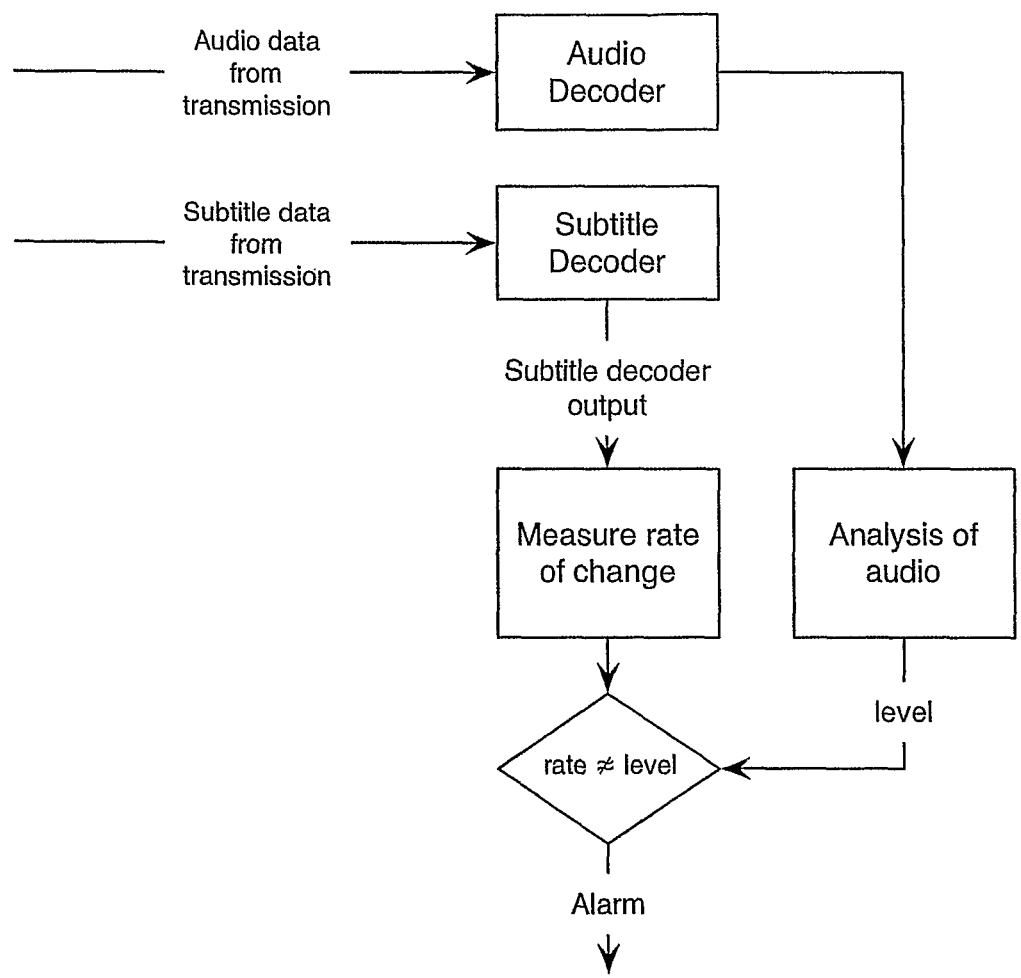

A preferred implementation is to analyse the activity of speech in the audio component of a TV programme. For example, use a voice activity detection algorithm to estimate the quantity of speech present in the audio and use this to estimate the range of levels of subtitle activity that should be present (see subtitle monitor with automatic estimation of level illustrated in FIG. 20).

Voice Activity Detection is a well researched area. As mentioned at e.g. http://en.wikipedia.org/wiki/Voice_activity_detection and Ramirez, J.; J. M. Górriz, J. C. Segura (2007). "Voice Activity Detection. Fundamentals and Speech Recognition System Robustness". in M. Grimm and K. Kroschel. Robust Speech Recognition and Understanding. pp. 1-22. ISBN 978-3-902613-08-0., voice activity detection (also known as speech activity detection or, more simply, speech detection) is a technique used in speech processing wherein the presence or absence of human speech is detected in regions of audio, which may also contain music, noise, or other sound. However, it is typically applied in other application domains e.g. audio conferencing, efficient use of telecommunications links etc.

Figure 21:
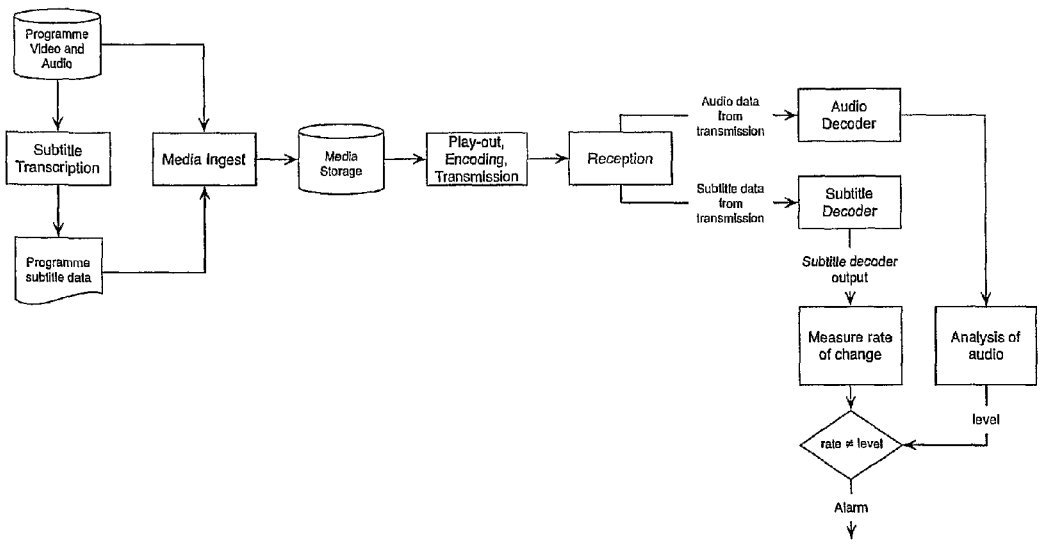

This preferred implementation has the merit that, as it is comparing the received subtitles with the received audio, it can potentially detect errors in many parts of the subtitle workflow (see the subtitle workflow illustrated in FIG. 21).

Subtitle Correctness Monitoring Assisted by Audio Speech Verification

Ostensibly speech recognition has a potential role in verifying correctness of subtitles. Accurate speaker independent speech recognition is demanding. However, for monitoring, significant simplifications can be made:

The speech recognition does not need to be highly accurate (as is required for other applications such as dictation). Rather, it is sufficient to determine that there is a reasonable correlation between the subtitle text and the speech in the transmission's audio.

Figure 22:
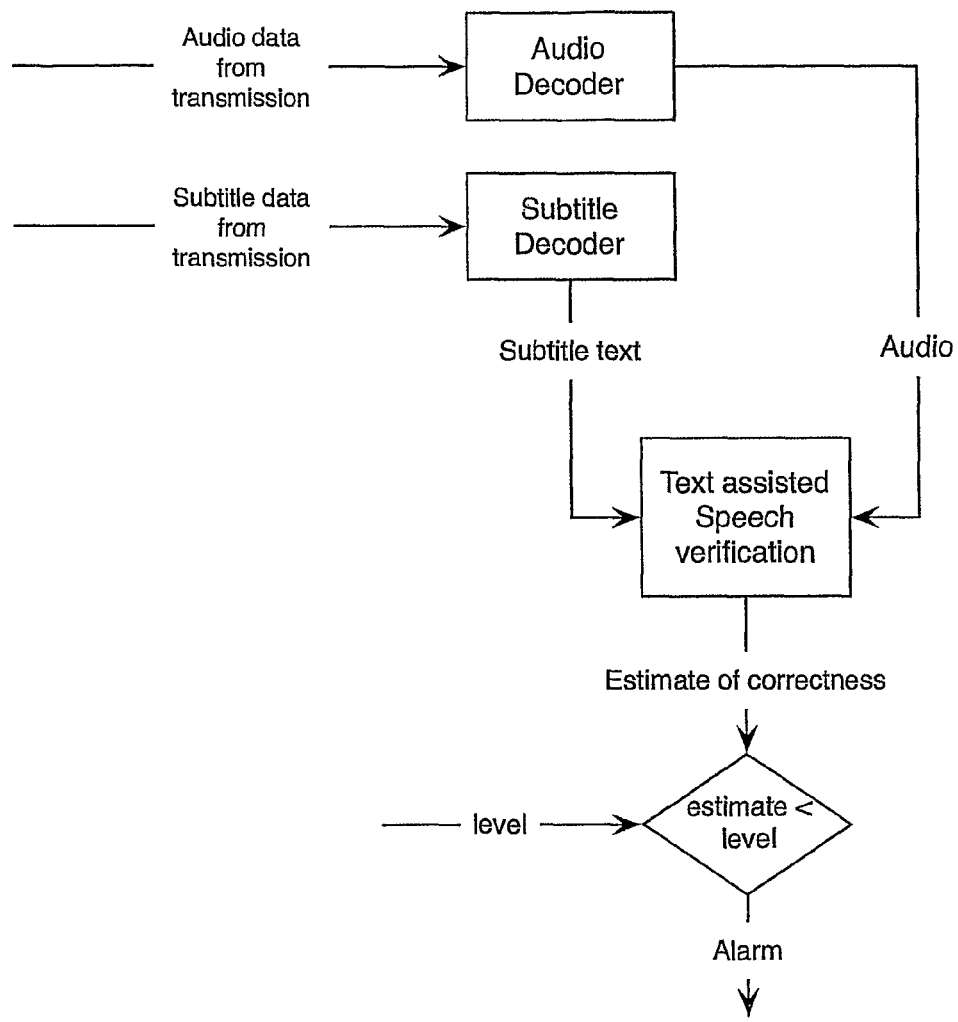
FIGS. 22 to 25 are a schematic diagrams illustrating various subtitle monitors.

The speech recognition can be simplified to the words appearing in subtitle data (i.e. recognition does not need to work across the entire dictionary) (see the subtitle monitor with text assisted speech verification illustrated in FIG. 22).

Speech verification is known to be an easier problem than speaker independent recognition. Speech verification uses speech recognition to verify the correctness of the pronounced speech. Speech verification does not try to decode unknown speech from a huge search space, but instead, knowing the expected speech to be pronounced, it attempts to verify the correctness of, for example, at least one of the utterance's pronunciation, cadence, pitch, and stress. Pronunciation assessment is the main application of this technology which is sometimes called computer-aided pronunciation teaching (as mentioned at e.g. http://en.wikipedia.org/wiki/Speech_verification).

In this example, speech verification is applied to monitoring.

Subtitle Language Detection for Verification in Multi-Language Environment

In an international broadcasting environment, a broadcast centre may be responsible for transmitting programmes to multiple countries. For example, sending the same pictures and sound to multiple countries but in each transmission the pictures and sound should be associated with one or more subtitles appropriate to the language(s) of the country.

In a broadcasting centre, it may not be practical to have broadcasting staff fluent in all of the languages transmitted. So, it may not be practical for the staff to monitor the correctness of the subtitles transmitted in each service.

Figure 23:
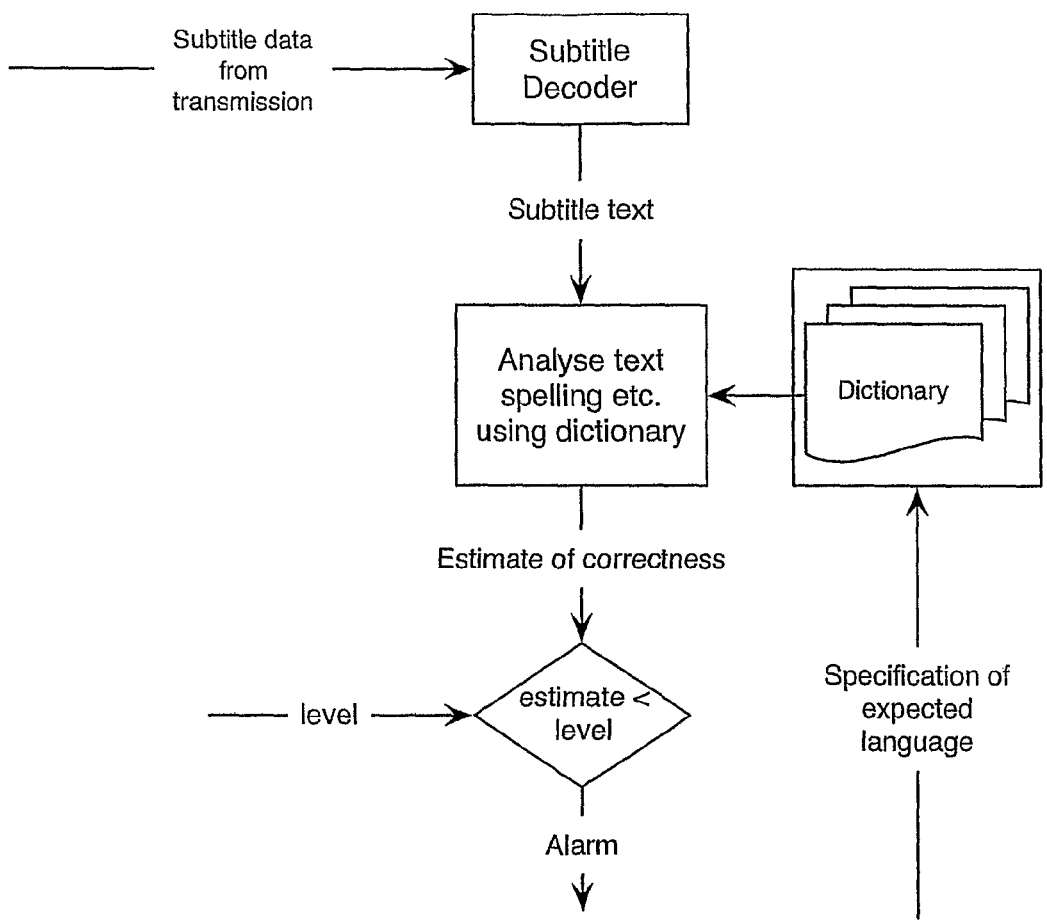

The language of subtitle text can be verified applying techniques such as spell checking with a specific dictionary. The statistics of spelling and/or grammar errors provide an indication of the correlation of the text in the subtitles to the language of a specified dictionary (see the subtitle monitor with language verification illustrated in FIG. 23). If the correlation of the subtitle text to the dictionary of the required language is sufficiently low an alarm can be raised.

Comparison of the subtitle text to a wider range of languages can provide further benefits. For example, assist rectification of problems (e.g. to identify incorrect routing of subtitle data); and modify the alarm threshold (e.g. subtitle text with typographic errors, such as can happen with live subtitling, is likely to cause poor correlation to all languages but should not lead to an alarm or should cause a different type of alarm)

Subtitle Monitoring Assisted by Automatic Text Translation

Figure 24:
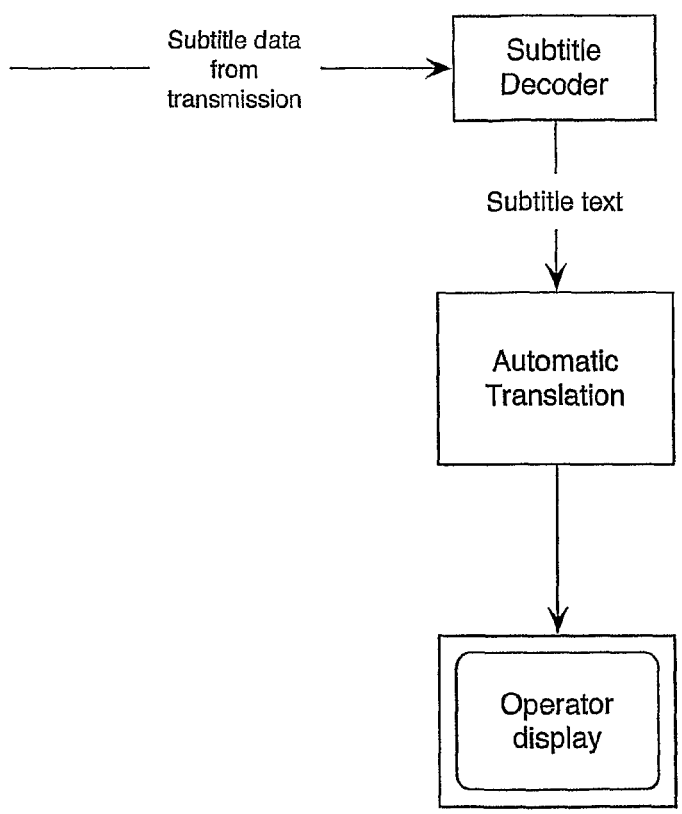

A broadcast centre may be responsible for transmitting programmes to multiple countries. It may not be practical to have broadcasting staff fluent in all of the languages transmitted. It is thus difficult for the staff to observe the subtitles and assess whether they are applicable to the program content (i.e. whether the correct subtitle is being broadcast). Automatic translation can be used to present a translation in to the language of the operator to allow the operator to assess the subtitles. The translation is not required to be perfect—just sufficiently good that an operator can infer its meaning. (see subtitle monitoring with automatic translation illustrated in FIG. 24).

Figure 25:
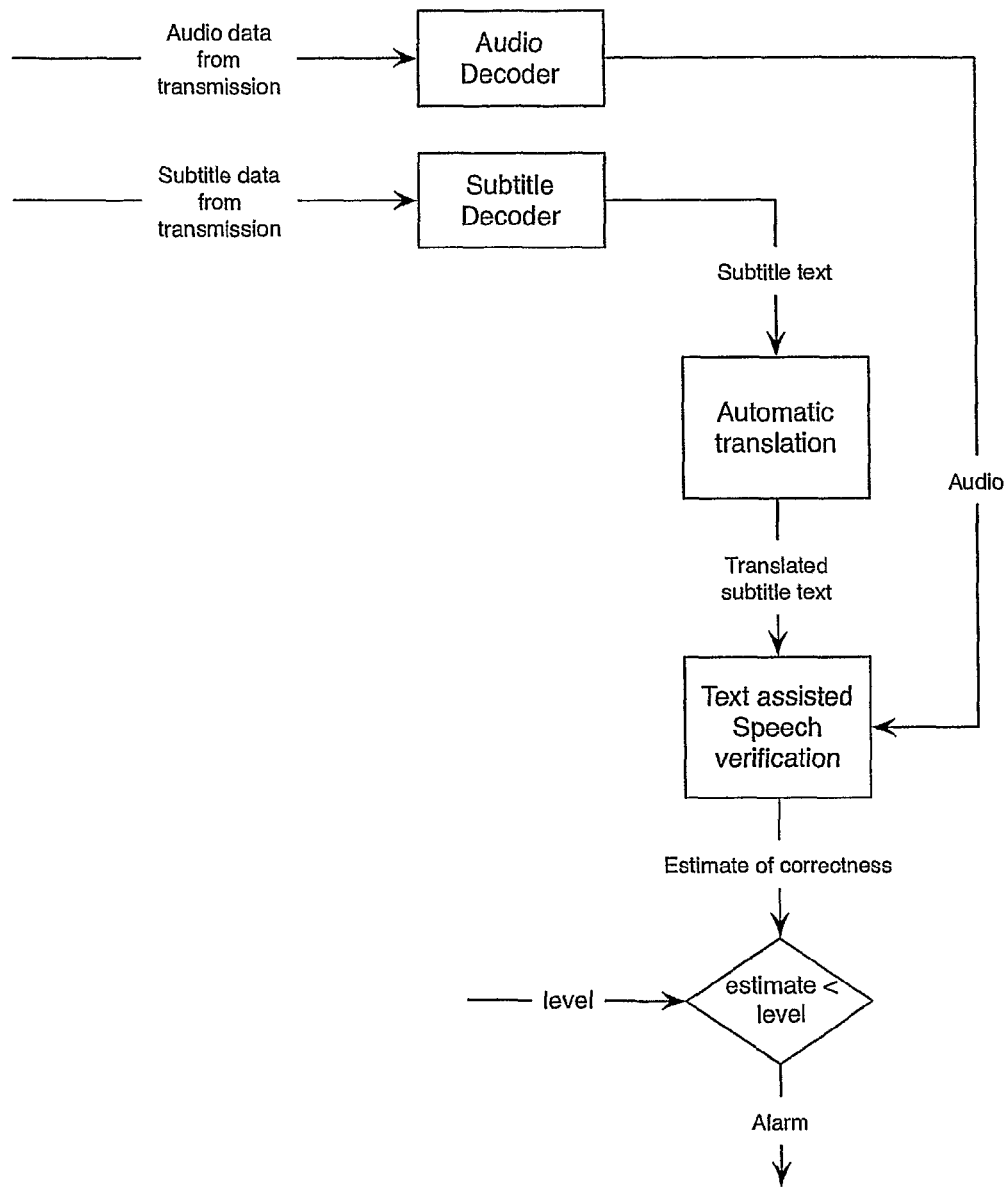

Subtitle Correctness Monitoring Assisted by Audio Speech Verification and Automatic Text Translation Translation and text assisted speech verification can be combined (see the subtitle monitor with translation and text assisted speech verification illustrated in FIG. 25) to provide subtitle verification where the subtitle language does not correspond to the audio language.

Using Optical Character Recognition to Assist Monitoring of Bitmap Subtitles

Figure 26:
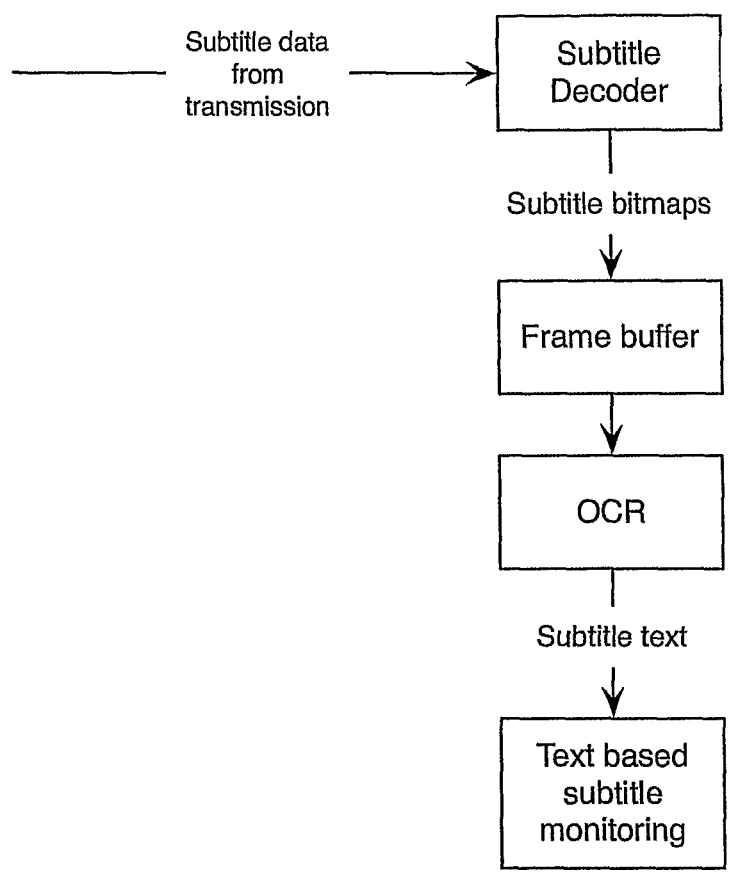
FIG. 26 is a schematic diagram illustrating a method of preparing text data for monitoring embodying an example of the present invention.

In some domains, subtitles are transmitted as bitmap graphics rather than as text. Many of the techniques described above rely on the availability of subtitle text. Character recognition such as optical character recognition (OCR) can be used to compute the text equivalent of the bitmap subtitles (see using OCR to assist monitoring subtitles illustrated in FIG. 26).

Examples of the present invention have been described. However, it will be appreciated that variations and modifications may be made to the examples described within the scope of the present invention. It will be appreciated that the different aspects described and claimed can be combined in any combination.

The invention claimed is:

1. A device comprising:
a receiver and a decoder for a testing device for a multiplexed data stream in the form of a digital television signal;
the multiplexed data stream comprising a plurality of encoded data components each being a television channel, wherein each of the encoded data components comprises a plurality of sections each representing different functionality,
the receiver comprising an input for inputting a plurality of encoded data components, a demultiplexer for demultiplexing the plurality of encoded data components, and a plurality of outputs each for outputting a demultiplexed one of the plurality of encoded data components,
the receiver being arranged, such that, in use, a plurality of encoded data components each being a television channel received at the input are demultiplexed by the demultiplexer and a demultiplexed one of the plurality of encoded data components is output from one of the plurality of outputs to the decoder, and
the decoder being arranged such that it comprises only at least one decoding portion for only decoding the section or sections required for testing an aspect of interest, and discards one or more sections from the digital television signal not required for testing the aspect of interest.

2. A receiver for a testing device for a multiplexed data stream in the form of a digital television signal, the multiplexed data stream comprising a plurality of encoded data components each being a television channel, the receiver comprising:

an input for inputting a plurality of encoded data components;

a demultiplexer for demultiplexing the plurality of encoded data components; and a plurality of outputs each for outputting a demultiplexed one of the plurality of encoded data components;

the receiver being arranged, such that, in use, a plurality of encoded data components each being a television channel received at the input are demultiplexed by the demultiplexer and a demultiplexed one of the plurality of encoded data components is output from one of the plurality of outputs.

3. A receiver according to claim 2, wherein the demultiplexer comprises a single processor or the processor is one and only one processor.

4. A receiver according to claim 2, which is arranged such that it discards one or more portions from the data stream not required for testing.

5. A testing device decoder for a testing device for a digital television signal comprising a plurality of encoded data components each being a television channel; wherein:

each of the encoded data components comprises a plurality of sections each representing different functionality; and the decoder is arranged such that it comprises at least one decoding portion for only decoding the section or sections required for testing an aspect of interest, and discards one or more sections from the digital television signal not required for testing the aspect of interest.

6. A testing device decoder according to claim 5, wherein at least one of the at least one decoding portions is an audio decoder for decoding audio.

7. A testing device decoder according to claim 5, wherein at least one of the at least one decoding portions is a video decoder for decoding video.

8. A testing device decoder according to claim 5, wherein at least one of the at least one decoding portions is an interactive decoder for decoding interactive content.

9. A testing device decoder according to claim 5, wherein at least one of the at least one decoding portions is a text decoder for decoding text.

10. A testing device decoder according to claim 9, wherein the text decoder is a subtitle decoder for decoding subtitles.

11. A testing device decoder according to claim 5, wherein at least one of the at least one decoding portions is arranged to partially decode encoded data components.

* * * * *